United States Patent [19]

Nakano et al.

[11] Patent Number: 5,110,658
[45] Date of Patent: May 5, 1992

[54] MAGNETIC RECORDING MEDIUM

[75] Inventors: Yasushi Nakano; Tohru Miyake; Shigeru Akutsu; Yuji Shimizu, all of Hino, Japan

[73] Assignee: Konica Corporation, Tokyo, Japan

[21] Appl. No.: 258,386

[22] Filed: Oct. 17, 1988

[30] Foreign Application Priority Data

Oct. 19, 1987 [JP] Japan .................. 62-263205
Oct. 20, 1987 [JP] Japan .................. 62-264240

[51] Int. Cl.$^5$ ............................................ G11B 23/00
[52] U.S. Cl. .................................. 428/141; 428/329; 428/694; 428/900
[58] Field of Search ................ 428/694, 900, 329, 141

[56] References Cited

U.S. PATENT DOCUMENTS

| | | | |
|---|---|---|---|
| 3,382,174 | 5/1968 | Hund et al. .................. | 252/62.57 |
| 4,390,361 | 6/1983 | Sueyoshi et al. ............. | 428/404 |
| 4,537,833 | 8/1985 | Kasuga et al. ............... | 428/900 |
| 4,690,863 | 9/1987 | Miyoshi et al. .............. | 428/694 |
| 4,752,530 | 6/1988 | Yamada et al. ............... | 428/694 |
| 4,801,505 | 1/1989 | Ejiri et al. ................ | 428/404 |
| 4,806,417 | 2/1989 | Saito et al. ................ | 428/694 |
| 4,874,668 | 10/1989 | Asada et al. ............... | 428/404 |
| 4,956,220 | 9/1990 | Sueyoshi et al. ............. | 428/900 |

Primary Examiner—Paul J. Thibodeau
Attorney, Agent, or Firm—Jordan B. Bierman

[57] ABSTRACT

A magnetic recording medium having a non-magnetic support and provided thereon a magnetic layer containing a ferromagnetic ion oxide and a binder, said ferromagnetic iron oxide containing Si and/or Al at a proportion of 0.10 to 0.25% by weight and methods of manufacturing a magnetic recording medium are disclosed.

9 Claims, 4 Drawing Sheets

MAGNETIC RECORDING MEDIUM

FIELD OF THE INVENTION

The present invention relates to a magnetic recording medium, more specifically, to a magnetic layer of a magnetic recording medium of a coated type, and to a preparation process thereof.

BACKGROUND OF THE INVENTION

The magnetic recording media used on an information processing apparatus are indispensable as a recording-reproducing element and are widely used. What is required of this type of recording media include higher levels of electromagnetic conversion characteristics that are correctly reproduced; large recording capacity of higher density; appropriate composition properties that ensures good traveling operation, durability, and longer life; lower price; and trouble-free manufacturing process. To satisfy these requirements, various technical efforts have been exerted.

To sum up, the objective of these technical efforts is essentially development of high performance magnetic media comprising fine particles of good electromagnetic performance, wherein individual particles are totally independent of others to ensure good dispersibility and good dispersion stability, and the media in the form of final product is free from troubles and has good durability.

Using fine ferromagnetic powder of a good S/N ratio and large specific surface area, however, results in problems such as magnetic particles insufficiently dispersed in a binder, and a viscous magnetic paint. These problems in turn jeopardize the surface smoothness, durability, and magnetic characteristics of the magnetic layer, imposing difficulties in providing high performance magnetic recording media.

Additionally, in regards with dispersibility of the magnetic powder, studies have been focused both on a dispersion agent and binder.

Such magnetic recording media also incurs various problems in production techniques.

First, finer magnetic particles, and finer fillers such as Carbon Black powder result in decreased dispersibility, incurring many steps and longer time for a dispersion process, imposing an unsolved bottleneck in production technique.

Second, the viscosity stability of the magnetic pain during standing is poor, making it difficult to positively form a uniformly thick coat as a magnetic layer. This in turn makes it mandatory to add, as a thinner, a large amount of a solvent, or a fatty acid, phosphoric ester or the like, causing cost increase, troubles by a residual solvent, loss in the Young's modulus, and, as a result, the recording medium is subject to jeopardized traveling characteristics, damages on edges, loss in RF output level, and jitter fluctuation.

The magnetic recording medium having been provided with structural layers such as a magnetic layer is subjected to a curing process at 50° to 70° C. for 24 to 48 hours in order to stabilize performance and properties, and to ensure conformity to quality standards. However, excessive smoothness on the medium surface results in syneresis of a solvent and additives, jeopardizing the traveling characteristics of the medium.

To solve the above productivity problems, not only improvements in additives and manufacturing apparatuses but also magnetic powder and binder that are indispensable and various thermosetting resins such as polyurethane, cellulose, vinyl chloride resins and phenoxy resins; various resins modified by introduction of a polar group; various resins whose properties modified by an introduced polar group; and thermoplastic resins of unique behavior. These are combined in good compatibility so that the properties of the structural layers on the magnetic recording medium have been significantly improved, and, at the same time, the dispersibility and deposition of the magnetic powder, filler and the like have been positively improved. These improvements, however, are still insufficient.

The studies on magnetic powder have been hitherto centered principally on electromagnetic conversion characteristics, and have lacked in the viewpoints mentioned above, though a few studies centered on pretreatment of magnetic powder using a dispersing agent, and examples where less than 0.1 wt% Si is added to magnetic powder incidentally suggest the solution to the problems. In other words, it is no exaggeration to say that conventional studies totally ignore possibility of treating the surface or inside of individual magnetic particles.

SUMMARY OF THE INVENTION

The object of the present invention is to solve the problems of the prior art, and therefore, the invention provides a magnetic recording media characterized in that:

(1) a post-curing magnetic tape does not show increase in friction coefficient, and has good traveling characteristics;

(2) a liquid dispersion for the medium has good viscosity stability;

(3) the medium in the form of a magnetic tape has a higher Young's modulus, and relatively free from residual solvent, and has good traveling characteristics;

(4) the medium has excellent electromagnetic conversion characteristics;

(5) the medium exhibits improved durability even under high temperature, high humidity environments;

(6) the medium has good durability;

(7) the magnetic layer of the medium exhibits good lubrication;

(8) the magnetic medium provides a still image of good durability; and (9) magnetic powder for the medium exhibits good dispersibility.

The object of the invention above is attained by a magnetic recording medium comprising a non-magnetic support provided thereon a magnetic layer containing a ferromagnetic iron oxide and a binder, wherein the ferromagnetic iron oxide contains Si and/or Al at a rate of 0.10 to 0.25 wt%.

DETAILED DESCRIPTION OF THE INVENTION

According to the invention, Si and/or Al being added to iron oxide is added in the course of generation of magnetic iron oxide powder, and is deemed present on the surface and inside of individual iron oxide particles.

Figure 1:
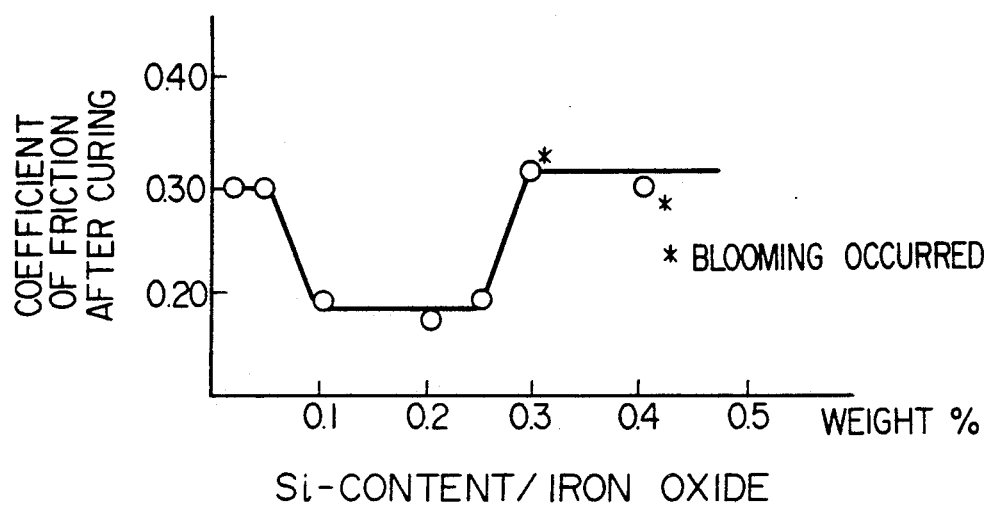
FIG. 1 is an explanatory diagram indicating, by using a graph, the effect of Si added to iron oxide powder.

FIG. 1 illustrates the correlation between amounts of Si added and friction coefficients of the magnetic layer undergone a curing process.

Once exceeding 0.1 wt% of total magnetic powder, the so-added silicon fully demonstrates its effect, while once exceeding 0.25 wt%, the silicon added unexpectedly loses its effect.

It seems that an excessive amount of silicon added prevents a lubricant such as a fatty acid from being adsorbed on the magnetic particles, thereby the lubricant is eluted to the magnetic layer surface, causing blooming and the friction coefficient drastically increases.

When incorporating Si into the magnetic powder, addition of calcium further improves the surface properties of magnetic particles, greatly improving the dispersion of the magnetic powder into a paint, or, more specifically, into a binder. According to this arrangement, the preferred amount of aluminum added is 0.11 to 0.19 wt%; the preferred amount of calcium added is 0.06 to 0.14 wt%, and the preferred Si/Ca ratio is not less than 1.10.

This type of magnetic powder exhibits peculiar wettability in conjunction with a binder that has a sulfo group and/or phospho group in the form of salt, in particular, in the form of alkali metal salt; or in conjunction with a bifunctional binder. This wettability seems to improve dispersibility of the magnetic powder to provide smooth magnetic surface.

An amount of silicon or calcium added smaller than the above range results in insufficient surface improving effects; while a similar amount larger than the above range results in inferior electromagnetic conversion characteristics. An Si/Ca ratio smaller than 1.10 results in inferior dispersibility of the magnetic powder. The particularly preferred amount of silicon added is 0.12 to 0.16 wt%; the similar amount of calcium added is 0.08 to 0.12 wt%; and the preferred Si/Ca ratio is $1.10 \leq Si/Ca \leq 2.5$, in particular, $1.20 \leq Si/Ca \leq 2.2$.

When incorporating Si into the magnetic powder, addition of zinc at a rate of 0.001 to 0.50 wt% further enhances the effect of the invention.

According to the invention, when using silicon in conjunction with zinc as mentioned above, the amount of silicon and zinc combinedly added to the ferromagnetic iron oxide powder is usually within a range of 0.10 to 0.25 wt%, or, preferably, within a range of 0.12 to 0.25 wt%. If the amount is less than 0.10 wt%, the surface activity of the ferromagnetic iron oxide particles may not be satisfactorily limited, and it may be impossible to inhibit an excessive amount of a binder having a functional group, or dispersing agent, from being adsorbed on the ferromagnetic iron oxide particles. On the other hand, the amount exceeding 0.25 wt% sometimes fails to provide an effect expected based on the amount, and, worse, may deteriorate the magnetic When using silicon (Si) and zinc (Zn) as mentioned above, the Si/Zn ratio, Si:Zn, is usually within a range of 30:1 to 1:30, or, preferably, within a range of 20:1 to 1:10.

According to the invention, apparatuses and material technologies hitherto used for manufacturing conventional magnetic tapes are applicable.

Magnetic materials useful in embodying the invention include oxide based magnetic materials such as $\gamma$-$Fe_2O_3$, Co-containing $\gamma$-$Fe_2O_3$, Co-coated $\gamma$-$Fe_2O_3$, $Fe_3O_4$, Co-containing $Fe_3O_4$, Co-coated $Fe_3O_4$, and $CrO_2$. The BET of any of such materials is within a range of 20 to 60 $m^2/g$.

To incorporate Si and Al, or Ca and Zn, into such magnetic powder, a predetermined amount of such elements is added during the final step in the manufacturing process of the similar powder, or is added to a liquid dispersion containing the similar powder.

In a conventional preparation process of Co-coated $\alpha$-$Fe_2O_3$, first, to an aqueous ferrous sulfate ($FeSO_4 \cdot 7H_2O$) solution is added sodium hydroxide (NaOH), and the resultant ferrous hydroxide ($(FeOH)_2$) is oxidated in air and then rinsed, to form $\alpha$-FeOOH that serves as nuclei of crystals being grown. Next, to a separately provided aqueous ferrous sulfate solution is added nuclei $\gamma$-FeOOH and metal iron, and the mixture is heated with air bubbling thereinto, and then, the iron component dissolves into the solution by oxidation, generating —FeOOH that precipitates on the nuclei $\alpha$-FeOOH, thereby crystal growth starts. The growth is terminated when, for example, the crystals have grown to a length of 0.6 to 1.0$\mu$, a width of 0.1 to 0.3$\mu$, and then, the crystals are subjected to filtration, water-rinsing, and drying, to obtain goethite powder. The goethite powder is further dehydrated and reduced in $H_2$ gas flow at approx. 400° C., to form $Fe_3O_4$. This product is gradually heated to approx. 200° C. in air, and $\gamma$-$Fe_2O_3$ is obtained. The so-obtained $\alpha$-$Fe_2O_3$ serving as nuclei for growing crystals is powdered into aqueous solution of iron sulfate and cobalt sulfate, where the solution containing predetermined amounts of Al, Si, Ca, Zn and the like, and then, alkali is added to the solution, thereby oxidation is allowed to continue for 1 to 3 hours at 60° to 80° C., in order to grow cobalt iron oxide on the surface of individual $\gamma$-$Fe_2O_3$ particles. Then the $\gamma$-$Fe_2O_3$ particles are subjected to filtration, water-rinsing, and drying, so as to obtain Co-coated $\gamma$-$Fe_2O_3$ particles.

When incorporating Si, Al, Ca, and Zn into the liquid dispersion, the examples of a useful silicon compound include silicic acids such as orthosilicic acid ($H_4SiO_4$), metasilicic acid ($H_2SiO_3$), metadisilicic acid ($H_2Si_2O_5$), metatrisilicic acid ($H_4Si_3O_8$), and metatetrasilicic acid ($H_6Si_4O_{11}$) silicon monoxide, and silicon dioxide; metal silicate salts such as sodium orthosilicate ($Na_4SiO_4$), sodium metasilicate ($Na_2SiO_3$), potassium metasilicate ($K_2SiO_3$), calcium orthosilicate ($Ca_4SiO_4$), calcium metasilicate ($Ca_2SiO_3$), barium metasilicate ($Ba_2SiO_3$), and cobalt metasilicate ($CO_2SiO_3$)

The examples of a zinc compound useful for this purpose include zinc dust, zinc chloride ($ZnCl_2$), zinc bromide ($ZnBr_2$), zinc iodide ($ZnI_2$), zinc nitrate, and zinc chlorate.

The binder useful in embodying the invention is a wear-resistant polyurethane. This material is capable of being strongly adhering to another material, and is mechanically resilient to repeatedly exerting stress or bending force, and has strong wear resistance and weather resistance.

The preferred polyurethane used for this purpose is one having a weight average molecular weight of 10000 to 200000, and glass transition point of −30° to 10° C.

Incorporating a cellulose resin and vinyl chloride copolymer in conjunction with a polyurethane further improves dispersibility of magnetic particles in the magnetic layer, thus enhancing tne mechanical strength of the layer. Using a cellulose rein and vinyl chloride copolymer alone results in too rigid a magnetic layer. This disadvantage, however, can be eliminated by incorporating a polyurethane.

The examples of a useful cellulose resin include cellulose ether, inorganic acid ester of cellulose, and cellulose-containing organic acid ester.

The above-mentioned vinyl chloride resin can be a resin of which portion having been hydrolyzed. The preferred vinyl chloride copolymer is a copolymer containing vinyl chloride-vinyl acetate.

To positively ensure the effect of the magnetic powder of according to the invention, it is preferable to use a vinyl chloride resin having an anionic functional group.

The examples of an anionic functional group in the above-mentioned resin include —SO₃M, —OSO₂M, —COOM, and

(wherein M represents a hydrogen atom, lithium atom or sodium atom; M¹ and M² independently represent a hydrogen atom, lithium atom, potassium atom, sodium atom, or alkyl group; M¹ and M² may be identical or different with each other).

The above-mentioned resin can be obtained, for example, by modifying a vinyl chloride resin to introduce the above-mentioned anionic functional group thereinto.

More specifically, such a resin can be obtained, based on a dehydrochlorination reaction, by allowing the vinyl chloride resin to react with a compound having in its molecular structure an anionic functional group and a chlorine atom, as exemplified by

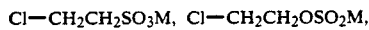

Cl—CH₂CH₂SO₃M, Cl—CH₂CH₂OSO₂M,

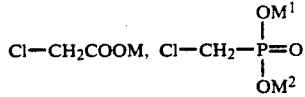

Cl—CH₂COOM, Cl—CH₂—P=O
                    |
                    OM²
                    |
                    OM¹

(wherein M, M¹ and M² are synonymous with those defined above).

The examples of the above-mentioned vinyl chloride resin include vinyl chloride-vinyl acetate-vinyl alcohol copolymers, vinyl chloride-vinyl propionate-vinyl alcohol copolymers, vinyl chloride-vinyl acetate-vinyl maleate-vinyl alcohol copolymers, and vinyl chloride-vinyl propionate-vinyl maleate-vinyl alcohol copolymers.

For example, when introducing a metal sulfonate salt group into the above-mentioned vinyl chloride resin to prepare the above-mentioned resin, the introduction is achieved by subjecting not only an OH group on a vinyl alcohol in any of the above copolymers and but also a chlorine atom in the above-mentioned metal sulfonate salt such as Cl—CH₂CH₂SO₃M, and Cl-CH₂CHSO₂M, to dehydrochlorination reaction in the presence of a dehydrochlorinating agent such as amine salt (for example, pyridine, picoline, and triethyl amine; and epoxy compound such as ethylene oxide, and propylene oxide.

Among these resins, the particularly preferred are vinyl chloride copolymers.

Such vinyl chloride copolymers can be obtained by copolymerizing vinyl chloride monomers; copolymerizable monomers containing an alkaline salt of sulfonic acid or phosphoric acid; and, according to a requirement, another type of copolymerizable monomers. This type of copolymer can be readily synthesized since it is obtained by vinyl synthesizing, and, additionally, various copolymerizable components can be arbitrarily employed for this purpose, thereby the optimum copolymer characteristics can be arbitrarily designed.

The metals in the form of a sulfonate salt or phosphorate salt are alkali metals such as sodium, potassium, and lithium. The especially preferred is potassium from the viewpoints of solubility, reactivity, and product yield.

The examples of the above-mentioned copolymerizable monomer containing a sulfonate salt include:

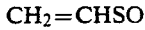
CH₂=CHSO₃M
CH₂=CHCH₂SO₃M
CH₂=C(CH₃)CH₂SO₃M
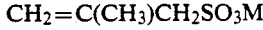
CH₂=CHCH₂OCOCH(CH₂COOR)SO₃M
CH₂=CHCH₂OCH₂CH(OH)CH₂SO₃M
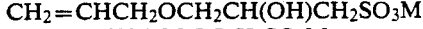
CH₂=C(CH₃)COOC₂H₄SO₃M
CH₂=CHCOOC₄H₈SO₃M
CH₂=CHCONHC(CH₃)₂CH₂SO₃M

The examples of the above-mentioned copolymerizable monomer containing a phosphorate salt include:

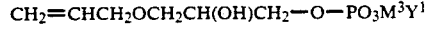
CH₂=CHCH₂OCH₂CH(OH)CH₂—O—PO₃M³Y¹

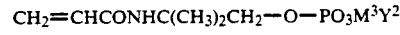
CH₂=CHCONHC(CH₃)₂CH₂—O—PO₃M³Y²

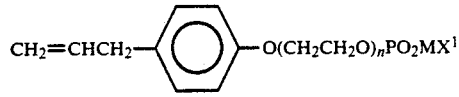
CH₂=CHCH₂—⌬—O(CH₂CH₂O)ₙPO₂MX¹

CH₂=CHCH₂O(CH₂CH₂O)ₘPOMX²

[wherein M represents an alkali metal atom; R represents an alkyl group having 1 to 20 carbon atoms; Y¹ represents a hydrogen atom, M or CH₂=CHCH₂OCH₂CH(OH)CH₂—; Y² represents a hydrogen atom, M or CH₂CH=CONHC(CH₃)₂CH₂—; X represents

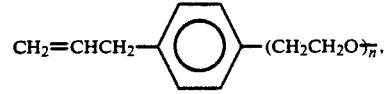
CH₂=CHCH₂—⌬—(CH₂CH₂O)ₙ,

OH or OM; X² represents CH₂=CHCH₂O(CH₂CH₂O)ₘ, OH or OM: m and n represents a positive integer, 1 to 100].

The examples of a copolymerizable monomer used in compliance with a requirement include various vinyl esters, vinyl chloridene, acrylonitrile, methachrylonitirile, styrene, acrylic acid, methacrylic acid, various acrylic acid esters, methacrylic acid esters, ethylene, propylene, isobutene, butadiene, isoprene, vinyl ether, aryl ether, aryl ester, acrylamide, methacryl amide, maleic acid, and maleic acid ester.

According to the invention, the previously mentioned binders can be synthesized by any of various polymerization processes such as emulsification polymerization, solution polymerization, suspension polymerization, and block polymerization. In any of these polymerization processes, known techniques such as use of a molecular weight adjuster, polymerization initiator, and step-by-step addition or continuous addition of monomers.

The amount of a monomer containing the above-mentioned acid group salt, as contained in a binder, is preferably 0.01 to 30 mol%. An excessively large amount of such a salt-containing monomer results in difficulty for the binder in being dissolved in a solvent, or is prone to cause gelation. On the other hand, an excessively small amount of such a monomer may result in failure in achieving intended characteristics.

The above-mentioned vinyl chloride copolymer preferably contains an epoxy or hydroxy group.

Incidentally, a prior art vinyl chloride is, for example, a copolymer of monomer units such as below.

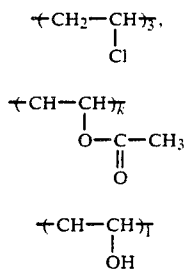

[wherein j, k and l independently represent an integer].

The CH$_3$CO—O— group in these examples seems to be a group not readily contributing to the crosslinking reaction with a curing agent or the like.

Therefore, according to the invention, an epoxy group such as;

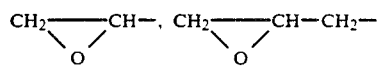

is preferably contained in these examples in place of the CH$_3$CO.

More specifically, those resins in the form of combination of the following units are available:

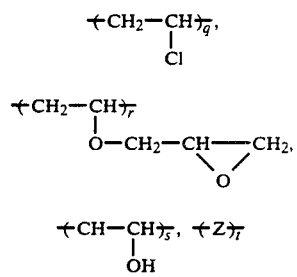

[wherein q, r and s are synonymous with those defined previously, and t represents an integer; Z represents a monomer unit containing alkali metal salt of sulfo group or phospho group].

The molecular weight of each of the above-mentioned resins is usually 5000 to 80000, or, preferably, 10000 to 30000. If the molecular weight is greater than 80000, viscosity of a magnetic paint is greater than a permissible range, thereby the friction coefficient of the magnetic layer of the resultant magnetic recording medium can be disadvantageously large, or operation efficiency in a production process can be deteriorated. On the other hand, if the molecular weight is smaller than 5000, and when a magnetic paint is applied onto the previously mentioned non-magnetic support and is cured using a curing agent, a certain area fail to undergo polymerization reaction, thereby a resultant low molecular weight area deteriorates the properties of the resultant layer.

The blending ratio of the above-mentioned resin is usually 5 to 30 parts by weight, or, preferably, 10 to 20 parts by weight per 100 parts of the ferromagnetic powder. The blending ratio is smaller than 5 parts by weight may result in poor dispersion of the ferromagnetic powder in the magnetic layer, and can possibly deteriorate the electromagnetic conversion characteristics, traveling characteristics, and durability of the magnetic recording medium of the invention. On the other hand, the blending ratio larger than 30 parts by weight may fail to provide effects proportional to the increase in the ratio.

A phenoxy resin can be used as a binder too. Phenoxy resins have various advantages: larger mechanical strength; excellent dimension stability; good resistance to heat, moisture, and chemicals; and good adhesion.

These advantages, working in conjunction with those of a polyurethane resin and compensating for the previously mentioned disadvantages of a polyurethane resin, significantly enhances shelf life of the magnetic tape especially in terms of physical properties of the tape.

According to the invention, the most favorable binder is a binder in the form of a binder mixture of a polyurethane resin, and a vinyl chloride resin having the previously mentioned anionic functional group.

In addition to these binders, the binder mixture may contain a thermoplastic resin, thermosetting resin, reactive resin, and electron beam-setting resin.

To improve durability of the magnetic layer of the magnetic tape of the invention, an arbitrary curing agent can be incorporated into a magnetic paint, and one example of which is isocyanate.

The useful aromatic isocyanates include tolylenediisocyanate (TDI), and the like; and adducts of these isocyanates and active hydride compounds. Those advantageous are the similar isocyanates having an average molecular weight of 100 to 3000.

The useful fatty acid isocyanates include hexamethylenediisocyanate (HMDI), and the like; and adducts of these isocyanates and active hydride compounds. Those advantageous among these examples are the similar isocyanates or adducts having an average molecular weight of 100 to 3000. Among these fatty acid isocyanates, those especially favorable are non-alicyclic isocyanates and adducts of these compounds and active hydride compounds.

A magnetic paint used for forming the magnetic layer contains a dispersing agent, and, according to specific requirements, additives such as a lubricant, abrasive, matting agent, and antistatic agent. The examples of a dispersing agent used in the invention include lecithin, phosphoric esters, amine compounds, alkyl sulfates, fatty acid amides, higher alcohols, polyethylne oxides, sulfosuccinic acid, sulfosuccinic acid esters, and known surfactants, and salts thereof. A polymer dispersing agent having an anionic organic group (for example, —COOH—PO₃H) may be used in the form of salt. The especially preferable are phosphoric esters whose structures represented by the following general formula.

General formula

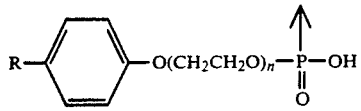

In general formula [I], the examples of a resin group represented by R include an alkyl group, alkoxy group, and alkenyl group. The alkyl group having 1 to 20 carbon atoms is especially favorable.

n represents a positive integer of 30 and greater, and whose maximum value being 300, and, preferably, within a range of 40 to 200.

The typical examples of a phosphoric ester used according to the invention are given below. However, the scope of the invention is not limited only to these examples.

1.

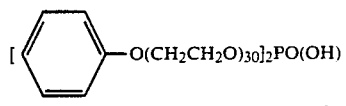

and monophosphoric acid salt thereof

2.

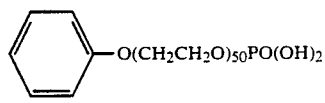

and diphosphoric acid salt thereof

3.

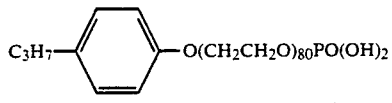

and diphosphoric acid salt thereof

4.

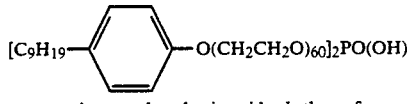

and monophosphoric acid salt thereof

5.

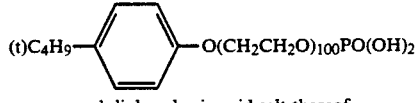

and diphosphoric acid salt thereof

6.

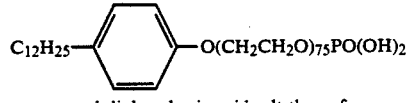

and diphosphoric acid salt thereof

7.

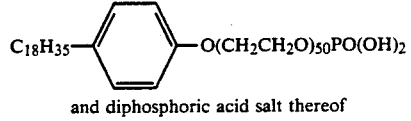

and diphosphoric acid salt thereof

8.

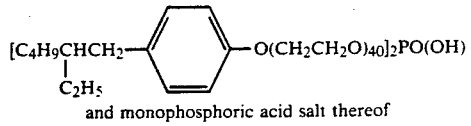

and monophosphoric acid salt thereof

An amount of such a phosphoric ester added is preferably 0.1 to 10 parts by weight, in particular, 0.1 to 6 parts by weight per 100 parts magnetic powder.

These dispersing agents can be used singly or in combination. Such a dispersing agent is added at a rate of 1 to 20 parts by weight per 100 parts by weight binder.

The examples of a useful lubricant include silicon oil, graphite, Carbon Black graft polymer, molybdenum disulfide, tungsten disulfide, lauric acid, myristic acid; monobasic fatty acid having 12 to 16 carbon atoms, and fatty acid ester (known as wax) having monovalent alcohol wherein a number of total carbon atoms in the fatty acid and alcohol is 21 to 23. Such a lubricant is added at a rate of 0.2 to The preferred abrasive is non-magnetic powder having Moh's hardness of not less than 5.0 and the examples of which include powders of chromium oxide, titanium oxide, α-iron oxide, silicon oxide, silicon nitride, silicon carbide, zirconium oxide, zinc oxide, cerium oxide, magnesium oxide, boron oxide, and alumina. Those preferred are alumina, chromium oxide, and α-iron oxide. The preferred average particle size is 0.05 to 2.0 μm, in particular, 0.1 to 1 μm. The preferred amount added is 1 to 15 wt%. The amount not more than 4 to 12 wt% results in decreased improvement on durability; in contrast, the amount exceeding 12 wt% results in deteriorated electromagnetic conversion characteristics.

As the matting agent, organic powder and inorganic powder are used independently or mixedly.

The preferred examples of organic powder used in embodying the invention include acryl styrene resin powder, benzoguanamine resin powder, melamine resin powder, and phthalocyanine pigment powder; and, additionally, other useful examples of which include polyolefin resin powder, polyester resin powder, polyamide resin powder, polyimide resin powder, and polyfluoroethylene resin powder. The examples of useful inorganic powder include silicon oxide, titanium oxide, aluminum oxide, calcium carbonate, barium sulfate, zinc oxide, tin oxide, aluminum oxide, chromium oxide, silicon oxide, calcium carbonate, α-Fe₂O₃, talc, caolite, calcium sulfate, boron nitride, zinc fluoride, and molybdenum dioxide.

The examples of a useful antistatic agent include electrically conductive powders of Carbon Black, graphite, tin oxide-antimony oxide compounds, and titanium oxide-antimony oxide compounds; natural surfactants such as glycerines, and glycidols; cationic surfactants, such as alkyl amines, quaternary ammonium salts, pyridine, and other heterocylic compounds, and phosphonium or sulfonium compounds; anionic surfactants, containing an acid group such as carboxylic acid, sulfonic acid, phosphoric acid, sulfuric ester, and phosphoric ester; amphoteric surfactants, such as amino acids, aminosulfonic acids, and sulfuric or phosphoric esters of aminoalcohols.

The examples of useful Carbon Black are those of average particle size of 10 to 70 mμ, and, more specifically, those of DBP absorption of not less than 100 ml/100 g.

The particularly advantageous mode of embodying the invention is that the magnetic layer contain two types Carbon Black of different average primary particle sizes.

The first Carbon Black decreases the friction coefficient of the magnetic layer of the magnetic recording medium of the invention, thereby the traveling characteristics of the medium are improved.

The average primary particle size of the first Carbon Black is within a range of 11 to 25 mµ. If the average primary particle size is less than 11 mµ, dispersibility of the ferromagnetic powder in the magnetic layer is possibly smaller. On the other hand, if the average primary particle size exceeds 25 mµ, the surface roughness of the magnetic layer is possibly greater, and may cause deterioration in electromagnetic conversion characteristics of the layer.

The second Carbon Black improves dispersion status of the ferromagnetic powder in the magnetic layer of the magnetic recording medium of the invention, thereby the friction coefficient of the layer is decreased.

The average primary particle size of the second Carbon Black is within a range of 30 to 45 mµ. If the average primary particle size is less than 30 mµ, dispersibility of the ferromagnetic powder in the magnetic layer is possibly smaller, and, the friction coefficient of the layer is greater, thereby improvement on the traveling characteristics of the magnetic tape may be insufficient. On the other hand, if the average primary particle size exceeds 45 mµ, the surface roughness of the magnetic layer is possibly greater, and may cause deterioration in electromagnetic conversion characteristics of the layer.

The blending ratio, in the magnetic layer, of the first Carbon Black and the second Carbon Black is, in terms of weight ratio of (second Carbon Black) to (first Carbon Black), usually, 99:1 to 30:70, or, preferably, within a range of 99:1 to 60:40.

The examples of a solvent incorporated into a magnetic paint of the invention, or of a solvent that is added to a solvent for dilution, include ketones such as acetone, methyl ethyl ketone, methyl isobutyl ketone, and cyclohexanone; alcohols such as methanol, ethanol, propanol, and butanol; esters such as methyl acetate, ethyl acetate, butyl acetate, ethyl lactate, and ethylene glycol monoacetate; ethers such as glycol dimethyl ether, glycol monoethyl ether, dioxane, and tetrahydrofurane; aromatic hydrocarbons such as benzene, toluene, and xylene; halogenated hydrocarbons such as methylene chloride, ethylene chloride, carbon tetrachloride, chloroform, and dichlorobenzene.

The preferred elastic modulus of the magnetic layer is not less than 450 kg/mm$^2$; the preferred density being within a range of 1.7 to 2.0 g/cm$^3$; and the preferred surface roughness being not more than 0.015 µm.

The elastic modulus of the magnetic layer can be enhanced to not less than 450 kg/mm$^2$ by mixedly using polyurethane, and a vinyl chloride or the like whose Tg being greater than that of the polyurethane used.

The density can be adjusted to an intended range by selected material types used and mixing ratio; Ra can be similarly adjusted by selecting calendering conditions.

The examples of a useful support include polyesters such as polyethylne terephthalate, and polyethylene-2,6-naphthlate; polyolefins such as polypropylene; cellulose derivatives such as cellulose triacetate, and cellulose diacetate; plastics such as polyamide, and polycarbonate. Other useful supports include metals such as Cu, Al, and Zn; and ceramics such as glass, BN, and Si carbide.

The thickness of the support is, in the form of film or sheet, approx. 3 to 100 µm, or, preferably, 5 to 50 µm; in the form of disk or card, 30 µm to 10 mm. If the support is in the drum form, that is, in a cylindrical form, the configuration of which is dependent upon a recorder used.

Between the support and he magnetic layer can be disposed an intermediate layer that improves adhesion between the layers.

The examples of a useful coating technique for forming the magnetic layer upon the support include the air-doctor coating process, blade-coating process, air-knife coating process, squeeze-coating process, impregnation-coating process, reverse-coating process, transfer-roller coating process, gravure-coating process, kiss-roll coating process, cast coating process, and spray coating process. However, these processes are not mandatory.

The magnetic recording medium of the invention can be used as a video tape, audio tape, floppy disk or the like.

If the invention is applied to the floppy disk, the magnetic layer on the floppy disk preferably contains, because of the affinity on the part of the liners that are in contact with the floppy disk, oleic acid ester (multivalent alcohol), wherein the liner is an nonwoven cloth containing each of polyether and rayon resins in an amount, respectively, of not less than 40 wt%.

Next, the manufacturing process of the magnetic recording medium of the invention is hereunder described.

If the BET of the magnetic paint is not less than 35 m$^2$/g and if its binder is a vinyl chloride resin having an anionic functional group, the medium is preferably prepared according to any of the the following procedures:

(1) a procedure comprising;

a step where a kneaded product is prepared by blending together vinyl chloride resin that contains one or more substituent groups selected from a group of sulfo group, phospho group, carboxyl group, alkali metal salt of sulfo group, alkali metal salt of phospho group, and alkali metal salt of carboxyl group; ferromagnetic powder whose BET value being not less than 35 m$^2$/g; dispersing agent, abrasive agent, Carbon Black, and solvent;

a step where to the kneaded product is added at least a solvent to dilute it, and then, the product is subjected to dispersing;

and a step where to the post-dispersing liquid dispersion are added at least solvent and lubricant to dilute it, and then, a curing agent is added to complete a magnetic coating solution;

(2) a procedure comprising;

a step where a kneaded product is prepared by blending together vinyl chloride copolymer resin that contains one or more substituent groups selected from a group of sulfo group, phospho group, carboxyl group, alkali metal salt of sulfo group, alkali metal salt of phospho group, and alkali metal salt of carboxyl group; polyurethane resin, ferromagnetic powder whose BET value being not less than m$^2$/g, dispersing agent, abrasive agent; Carbon Black, and solvent;

a step where to the kneaded product is added at least a solvent to dilute it, and then, the product is subjected to dispersing;

and a step where to the post-dispersing liquid dispersion are added at least solvent and lubricant to dilute it, and then, a curing agent is added to complete a magnetic coating solution;

(3) a procedure comprising;

a step where a first kneaded product is prepared by blending together vinyl chloride resin that contains one or more substituent groups selected from a group of sulfo group, phospho group, carboxyl group, alkali metal salt of sulfo group, alkali metal salt of phospho group, and alkali metal salt of carboxyl group; ferromagnetic powder whose BET value being not less than 35 $m^2/g$, dispersing agent, abrasive agent, Carbon Black, and solvent;

a step where a second kneaded product is prepared by blending together the above-mentioned resin, Carbon black, dispersing agent, and solvent;

a step where a third kneaded product is prepared by blending the first blended product with the second blended product;

a step where to the third kneaded product are added at least a solvent and abrasive agent to dilute it, and then, the product is subjected to dispersing;

and a step where to the post-dispersing liquid dispersion are added at least solvent and lubricant to dilute it, and then, a curing agent is added to complete a magnetic coating solution;

(4) a procedure comprising;

a step where a mixture is prepared by blending ferromagnetic powder whose BET value being not less than 35 $m^2/g$, with a dispersing agent which is liquid at a normal temperature;

a step where a kneaded product is prepared by blending together the above-mentioned mixture; vinyl chloride resin that contains one or more substituent groups selected from a group of sulfo group, phospho group, carboxyl group, alkali metal salt of sulfo group, alkali metal salt of phospho group, and alkali metal salt of carboxyl group; dispersing agent, abrasive agent, Carbon Black, and solvent;

a step where to the kneaded product is added at least a solvent to dilute it, and then, the product is subjected to dispersing;

and a step where to the post-dispersing liquid dispersion are added at least solvent and lubricant to dilute it, and then, a curing agent is added to complete a magnetic coating solution;

(5) and a procedure comprising;

a step where a kneaded product is prepared by blending together vinyl chloride copolymer resin that contains one or more substituent groups selected from a group of sulfo group, phospho group, carboxyl group, alkali metal salt of sulfo group, alkali metal salt of phospho group, and alkali metal salt of carboxyl group; urethane resin that contains one or more substituent groups selected from a group of sulfo group, phospho group, carboxyl group, alkali metal salt of sulfo group, alkali metal salt of phospho group, and alkali metal salt of carboxyl group; ferromagnetic powder whose BET value being not less than 35 $m^2/g$, dispersing agent, abrasive agent, Carbon Black, and solvent;

a step where to the kneaded product is added at least a solvent to dilute it, and the, the product is subjected to dispersing;

and a step where to the post-dispersing liquid dispersion are added at least solvent and lubricant to dilute it, and then, a curing agent is added to complete a magnetic coating solution.

In these procedures, the preferred viscosity of a solution undergoing treatment in each step ranging from the dispersing step up to an actual coating operation is not in excess of 10000 cps.

Once coating is complete, orientation/drying process is performed. An orientation station is disposed in plurality, wherein drying preferably is performed so that the magnetic powder/solvent ratio by weight, in the magnetic layer formed with the magnetic coating solution, at the final orientation station, is 1/1.3 to 1/1.7, and so that the drying is complete at the very last portion of the final orientation station.

The magnetic layer, or both side edges of the layer and the back face of the magnetic medium are preferably subjected to a wiping process after the drying, and prior to the calendering process. The wiping operation is preferably performed using a nonwoven cloth having an embossed face. A preferred nonwoven fabric material is a blended fabric type nonwoven cloth comprising 30 to 85% rayon, and 70 to 15% polypropylene and/or polyester.

A further preferable mode of the invention is to collect dust particles via a nonwoven cloth.

EXAMPLES

The present invention is hereunder described in detail referring to Examples.

EXAMPLES 1 THROUGH 5, AND COMPARATIVE EXAMPLES 1 THROUGH 5

Based on the magnetic paint recipes in the following Table 1, and using a sandmill, ingredients were dispersed, and the resultant paints were subjected to a coating operation under common specific conditions, thus magnetic tape samples were prepared.

TABLE 1

| | | Magnetic paint recipe | | | | | | | | | |
|---|---|---|---|---|---|---|---|---|---|---|---|
| | | Sample | | | | | | | | | |
| | | Invention | | | | | Comparative | | | | |
| | Components | 1 | 2 | 3 | 4 | 5 | (1) | (2) | (3) | (4) | (5) |
| Specific | CO-$\gamma Fe_2O_3$ | 100 | 100 | 100 | 100 | 100 | 100 | 100 | 100 | 100 | 100 |
| components | Al (wt %) | 0.01 | 0.18 | 0.18 | 0.01 | 0.01 | 0.01 | 0.01 | 0.01 | 0.01 | 0.01 |
| | Si (wt %) | 0.15 | 0.10 | 0.10 | 0.10 | 0.20 | 0.03 | 0.03 | 0.03 | 0.06 | 0.30 |
| | Lubricant (1) | 2 | 2 | 3 | 3 | 3 | 2 | 4 | 2 | 3 | 3 |
| | Dispersing agent | 2 | 2 | 0 | 0 | 0 | 2 | 4 | 2 | 0 | 0 |
| | Methyl ethyl ketone | 150 | 150 | 150 | 150 | 150 | 150 | 150 | 200 | 150 | 150 |
| *Common | Lubricant (2) | ;Butyl stearate | | | | | | | | 1 | |
| components | Carbon Black | ;Light-shielding power/electrical conductivity = 9/1 | | | | | | | | 10 | |
| | Vinyl chloride | ;Modified with polar group (containing sulfo group) | | | | | | | | 15 | |
| | Polyurethane resin | ;Tg = −20° C.; molecular weight, 80000 | | | | | | | | 10 | |
| | Abrasive agent | ;—$Al_2O_3$ | | | | | | | | 7 | |
| | Polyisocyante | Mitec Ad-30 (Mitsubishi Chemical Industries) | | | | | | | | 10 | |

TABLE 1-continued

| | Magnetic paint recipe Sample | | | | | | | | | |
|---|---|---|---|---|---|---|---|---|---|---|
| | Invention | | | | | Comparative | | | | |
| Components | 1 | 2 | 3 | 4 | 5 | (1) | (2) | (3) | (4) | (5) |
| Toluene | | | | | | | | 150 | | |

Note:
CO-$\gamma$-Fe$_2$O$_3$: BET value, 25 to 45 m$^2$/g
Lubricant (1); myristic acid/stearic acid = 1/1
Dispersing agent: phosphoric acid ester, GAFACRE-960 (Toho Kagaku)
*Parts of common components are parts by weight per 100 parts by weight Fe$_2$O$_3$ The above specified magnetic paints were independently applied to and dried on a polyethylene terephthalate film, and then, the respective film were slit to prepare individual magnetic tape samples. The resultant measurments on characteristics of the respective magnetic tapes are listed in Table 2.

on paint properties and on the traveling characteristics of the magnetic tape. In contrast, comparative examples in general exhibit poor similar properties as well as poor similar characteristics, and, even if satisfying two or three criteria, these comparative examples fail to satisfy industrially acceptable levels in remaining criteria.

TABLE 2

| | | Sample | | | | | | | | | |
|---|---|---|---|---|---|---|---|---|---|---|---|
| | | Invention | | | | | Characteristics | | | | |
| | Comparative | 1 | 2 | 3 | 4 | 5 | (1) | (2) | (3) | (4) | (5) |
| Paint charac- teristics | Dispersing rate | 5 | 5 | 5 | 5 | 5 | 2 | 3 | 3 | 2 | 4 |
| | Viscosity stability | o | o | o | Δ | o | x | Δ | Δ | x | Δ |
| | Increase in filtering pressure | o | o | o | o | o | Δ | x | Δ | o | o |
| Tape charac- teristics | Friction coefficient | 0.22 | 0.19 | 0.18 | 0.19 | 0.17 | 0.30 | 0.30 | 0.33 | 0.38 | 0.33* |
| | Young's modulus (Kg/m$^2$) | 500 | 520 | 540 | 500 | 520 | 480 | 420 | 430 | 490 | 490 |
| | Amount of residual solvent | o | o | o | o | o | Δ | Δ | x | o | o |
| | Traveling characteristics (40° C., RH 80%) | o | o | o | o | o | x | x | x | x | x |

Note.
Blooming occurs

EVALUATION

Dispersing Rate

Evaluated on a five level evaluation system. Level 3 means that a rate is within an industrially acceptable range; level 5, a rate is significantly high; and level 1, a rate is significantly low.

Viscosity Stability

Evaluated on a three level evaluation system. o means viscosity remains constant during standing; Δ, viscosity remains within an industrially acceptable range in spite of increase; x, increased viscosity jeopardized industrial usefulness of paint.

Increase in Filtering Pressure

Evaluated on a three level evaluation system. o, free from increase in a paint filtering pressure, during standing, due to agglomeration of magnetic particles or gelation of binder; Δ, industrially acceptable; and x, not industrially acceptable.

Amount of Residual Solvent

Evaluated on a three level evaluation system. o, virtually no residual solvent that may cause problems after drying; Δ, residual solvent being within an industrially acceptable range, if any; x, industrial usefulness being jeopardized.

Traveling Characteristics

Traveling characteristics of a magnetic tape are evaluated on two level evaluation system. o means there are virtually no trouble in traveling of the tape; x, occasional troubles.

As can be understood from the data in Table 2, each of example sample satisfactorily satisfies each criterion

EXAMPLE 6

The compositions specified below were poured into a sand mill and dispersed, and then, additives were added for diluting. The resultant magnetic paint was filtered with a 1 μm mesh filter, and, polyvalent isocyanate (Coronate L, Nippon Polyurethane Kogyo) was added, and the paint was applied onto a support so that the dry thickness of the magnetic layer for formed was 5 μm, thereby the support was subjected to a supercalendering process, and was slit into ½ inch strips, thus the videotape samples according to the invention were obtained.

| | |
|---|---|
| Co-coated $\gamma$-Fe$_2$O$_3$ (same as in Example 1) | 100 wt parts |
| Alumina (ave. particle size, 0.6 μm; BET, 15 m$^2$/g) | 10 wt parts |
| Carbon Black A (particle size, 40 μm) | 1 wt part |
| Carbon Black B (particle size, 20 μm) | 9 wt parts |
| Vinyl chloride-vinyl acetate copolymer (containing sulfo group, epoxy group, and hydroxy group) | 10 wt parts |
| Polyurethane (N-2304, Nippon Polyurethane Kogyo) | 5 wt parts |
| Myristic acid | 1 wt part |
| Butyl stearate | 0.5 wt part |
| Methyl ethyl ketone | 100 wt parts |
| Toluene | 100 wt parts |

EXAMPLE 7

Example samples 7 were prepared based on a recipe identical with that of Example 6 except that 1 wt part phosphoric acid ester was added.

COMPARATIVE EXAMPLE 6

Comparative samples were prepared based on a recipe identical with that of Example 6 except that the vinyl chloride-vinyl acetate copolymer of the invention was replaced with an equivalent amount of vinyl chloride-vinyl acetate copolymer, VAGH, manufactured by Union Carbide, (lacking either a sulfo group or epoxy group).

COMPARATIVE EXAMPLE 7

Samples were prepared based on a recipe identical with that of Example 6 except that the vinyl chloride-vinyl acetate copolymer of the invention was replaced with an equivalent amount of vinyl chloride copolymer (polymer resin formed by eliminating a vinyl acetate component in the resin of Example 1).

COMPARATIVE EXAMPLE 8

Samples were prepared based on a recipe identical with that of Example 6 except that alumina, Carbon Blacks A, and B were eliminated.

Using each of the so-obtained video tapes the following items were measured.

RF Output

Using a VTR deck designed for RH output measuring, the RH output was measured (unit, in dB).

Lumi S/N

This item was measured using a color video noise meter, Model 925 D/1, manufactured by Shibasoku.

Number of Dropouts

Using Shibasoku Model VH01BZ, a number of data dropouts occurred in one minute at $-14$dB/10 $\mu$s.

Powder Departure

A magnetic tape was allowed to run for 200 passes as loaded on a video tape deck, and then, the contamination on the reading/recording head (powder departed) was collected, thereby this item was visually evaluated.

The results thus obtained are listed in Table 3.

TABLE 3

| | Invention 6 | Invention 7 | Comparative 6 | Comparative 7 | Comparative 8 |
|---|---|---|---|---|---|
| RF output (dB) | +2.5 | +2.5 | +1.0 | +2.0 | +2.5 |
| Lumi S/N | +3.8 | +4.0 | +2.0 | +3.5 | +3.5 |
| Number of dropouts | 5–10 | 5–10 | 10–20 | 30–50 | 5–10 |
| Powder departure (200 passes) | None | None | Slightly | Yes | Yes |
| Output loss after 200 passes (dB) | −0.2 | −0.1 | −0.1 | −0.5 | −2.0 |

As can be understood from the results in Table 3, samples according to the invention have good electromagnetic conversion characteristics, and physical properties, and particularly excel in durability.

EXAMPLES 8 and 9

Components in the recipe of Table 4 were poured into a ball mill and subjected to dispersion. The resultant magnetic paint was filtered with a 1 $\mu$m mesh filter, and 10 parts polyvalent isocyanate (Coronate L, Nippon Polyurethane Kogyo) was added, and the paint was applied onto a support so that the dry thickness of the magnetic layer formed was 5 $\mu$m, thereby the support was subjected to a supercalendering process, and was slit into ½ inch strips, thus the videotape samples (corresponding to ID numbers of the respective examples and comparative examples).

Numerical data in Table 4 represents parts by weight, and "Exam" means an example according to the invention.

TABLE 4

| | | Invention 1 | Invention 2 |
|---|---|---|---|
| Co-coated —Fe$_2$O$_3$ (same as in Example 1) | | 100 | 100 |
| Alumina | | 7 | 7 |
| Carbon Black | | 10 | 10 |
| Vinyl chloride resin containing SO$_3$Na salt | | 20 | 20 |
| Resin containing vinyl chloride with OH and vinyl acetate*1 | | 0 | 0 |
| Polyurethane resin*2 | | 10 | 20 |
| Phosphoric ester*3 | n < 30 | 0 | 0 |
| | n ≦ 30 | 3 | 3 |
| Lecithin | | 0 | 0 |
| Stearing acid | | 2 | 2 |
| Butyl stearate | | 1 | 1 |
| Polyvalent isocyanate | | 10 | 10 |
| Methyl ethyl ketone | | 150 | 150 |
| Toluene | | 150 | 150 |

*1 VAGH. Union Carbide
*2 N-2304. Nippon Polyurethane
*3 GAFAC (Toho Kagaku) RE610 (n < 30)
RE960 (n < 30)

Video tape samples prepared in the above examples were evaluated based on the following criteria, for dispersibility of magnetic paint used, and for electromagnetic conversion characteristics of the video tapes, and hydrolitic dissociation resistance of the magnetic layer.

Average Surface Coarseness

The average surface coarseness of a magnetic tape, after a residence time for dispersing, respectively, of 30 minutes, 1 hour, and 1.5 hours, prior to undergoing calendering process, was measured (cutoff level, 0.25 mm).

Chroma S/N

This item was measured with a color video noisemeter, Shibasoku Model 925 D/1.

Lumi S/N

Same as above.

RF Output

Using a VTR deck designed for RH output measuring, the RH output at 4 MHz was measured (unit, in dB).

Chroma Output

The chroma output at 500 KHz was measured in a manner identical with that of the RF output (unit, in dB). Young's modulus:

The Young's modulus of each sample undergone standing for 100 hours, either at 20° C. and 50%RH, or at 40° C. and 80%RH, was measured.

The data of each video tape are listed in Table 5.

TABLE 5

|  |  | Invention 1 | Invention 2 |
|---|---|---|---|
| Average surface coarseness | 0.5 hr. residence | 0.035 | 0.034 |
|  | 1 hr. residence | 0.029 | 0.030 |
|  | 1.5 hr. residence | 0.025 | 0.026 |
| Electromagnetic conversion characteristics | Lumi S/N | +2.0 | +2.1 |
|  | RF output | +0.8 | +0.9 |
|  | Chroma S/N | +1.9 | +1.9 |
|  | Chroma output | +1.9 | +1.8 |
| Young's modulus | 20° C. 50% RH | 510 | 490 |
|  | 40° C. 80% RH | 505 | 490 |

As can be understood from the data in Table 5, samples of the invention exhibited good dispersion status of magnetic powder, and, accordingly, the samples of the invention excel in electromagnetic conversion characteristics, as well as physical properties (durability under high temperature, high humidity environments, in particular).

EXAMPLES 10 through 14

For these examples, a vinyl chloride copolymer containing a salt was synthesized in the following manner.

The compositions specified below were poured into a reaction vessel, and air within the vessel was replaced with $N_2$, thereby chemical reaction was allowed to occur.

| Methyl isobutyl ketone | 86 wt parts |
|---|---|
| Methyl acetate | 280 wt parts |
| Vinyl chloride | 150 wt parts |
| Vinyl acetate | 50 wt parts |
| $CH_2=CHCH_2OCOCH(SO_3K)CH_2COOC_8H_{17}$ | 6 wt parts |
| Diisopropyl peroxydicarbonate (Polymerization initiator) | 2 wt parts |

The mixture comprising the above compositions was heated to 53° C. with stirring, and methyl isobutyl ketone was added in an amount of 9 parts per 1 part polymerization initiator specified in the recipe above. 15 hours after, the mixture was allowed to cool to 30° C., and residual vinyl chloride was removed for reuse, and the removal procedure was perfected under a reduced pressure. Thus 480 parts by weight of copolymer solution whose solid portion being 32%, and viscosity 70 cps (25° C.) was obtained, and this product was designated binder A. Then the magnetic paint of the following composition was prepared.

| Binder A | 15 parts |
|---|---|
| Polyurethane (Estan 5701, Goodrich) | 7 parts |
| Co-coated $\gamma$-$Fe_2O_3$ (BET, not less than 40 m²/g) | 100 parts |
| Dispersing agent (lecithin) | 3 parts |
| Alumina | 1 part |
| Carbon Black | 6 parts |
| Fatty acid (palmitic acid) | 1 part |
| Fatty acid ester (isooctyl palmitate) | 1 part |
| Cyclohexanone | 150 parts |
| Methyl ethyl ketone | 70 parts |
| Toluene | 30 parts |

The above components were poured into a ball mill, and dispersed, and then, 5 parts trifunctional isocyanate was added to the resultant paint, which as applied onto a support in a thickness of 5 μm, thereby the support was subjected to a supercalendering process. The resultant magnetic tape was slit into ½" strips to prepare individual video tapes.

The individual video tapes were subjected to the measuring operation for the following criteria. The measuring results obtained are listed in Table 7.

RF output

Using a VTR deck designed for RH output measuring, the RH output at 5 MHz was measured. The measurement values are indicated based on that of a reference video tape, that is a video tape of Comparative Example 1 having undergone 100 times of data reproducing (unit, in dB).

Lumi S/N

This item was measured using a color video noise meter, Model 925 D/1, manufactured by Shibasoku. The measurement values are indicated using a difference from the lumi S/N ratio of the video tape of Comparative Example 1, i.e. a reference video tape (0 dB). The threshold level of the high pass filter was 4.2 MHz, and that of the low pass filter was 10 KHz.

Number of Dropouts

This item was measure using a number of image dropouts on a reproduced image.

Still Image Durability

A degree of loss in still image output for a duration of 2 hours was indicated in dB. The smaller the value is, the higher the durability and wear resistance of the magnetic recording medium.

Powder Departure

After traveling operation of the magnetic tape, dust deposited on the recording/recording head, cylinder, and pinch roller was visually evaluated. (o, virtually no deposition; Δ, minor deposition; x, larger deposition)

As can be understood from the data in Table 7, using a specific Co-coated magnetic powder, in conjunction with binder A, in accordance with the invention, positively provides good results, and advantage of the invention is apparent.

Table 7 lists the characteristics of each recording medium.

TABLE 6

|  | Example 10 | Example 11 | Example 12 | Example 13 | Example 14 |
|---|---|---|---|---|---|
| Ferromagnetic powder CO-coated $\gamma$-$Fe_2O_3$ | 100 parts | | | | |
| Binder A | 15 parts | | | | |
| Polyurethane | 7 parts | | | | |
| Alumina | 1 part | Same as left | | | |
| Carbon Black | 6 parts | | | | |
| Fatty acid | 1 part | | | | |
| Fatty acid ester | 1 part | | | | |
| Lecithin | 3 parts | | | | |

TABLE 6-continued

|  | Example 10 | Example 11 | Example 12 | Example 13 | Example 14 |
|---|---|---|---|---|---|
| Cyclohexanone | 150 parts | | | | |
| Methyl ethyl ketone | 70 parts | | | | |
| Toluene | 30 parts | | | | |
| Amount of Si in ferromagnetic powder | 0.15 wt % | 0.11 wt % | 0.146 wt % | 0.18 wt % | 0.15 wt % |
| Amount of Ca in ferromagnetic powder | 0.10 wt % | 0.10 wt % | 0.13 wt % | 0.09 wt % | 0.06 wt % |
| Si/Ca | 1.5 | 1.10 | 1.12 | 2.0 | 2.5 |

TABLE 7

|  | RF output (dB) | Lumi S/N (dB) | Dropout (−12 dB, 15 μs) | Still image durability (dB/2 hr) | Squareness ratio | Post-traveling powder departure | |
|---|---|---|---|---|---|---|---|
| Example 10 | +2.2 | +2.0 | 2 | −0.5 | 0.85 | OK | ○ |
| Example 11 | +2.0 | +1.9 | 4 | −0.4 | 0.83 | OK | ⊙ |
| Example 12 | +2.1 | +1.9 | 1 | −0.4 | 0.85 | OK | ○ |
| Example 13 | +2.2 | +1.8 | 5 | −0.2 | 0.86 | OK | ○ |
| Example 14 | +2.1 | +2.0 | 4 | −0.4 | 0.84 | OK | ○ |

EXAMPLE 15

Based on the recipe below, the components for forming a magnetic layer were blended and dispersed for 3 hours using a sand mill to prepare a liquid dispersion. Then to the dispersion was added 5 parts polyisocyanate compound, and, thus a magnetic paint was prepared.

| | |
|---|---|
| Co-containing γ-Fe₂O₃ powder | 100 parts |
| α-Al₂O₃ | 7 parts |
| Carbon Black | 10 parts |
| Vinyl chloride copolymer containing potassium sulfonate (same as Example 10) | 20 parts |
| Thermoplastic polyurethane resin | 10 parts |
| Fatty acid | 3 parts |
| Fatty acid ester | 1 part |
| Polyisocyanate | 10 parts |
| Methyl ethyl ketone | 150 parts |
| Toluene | 150 parts |

An amount of silicon and/or zinc in each of the above Co-containing γ-Fe₂O₃ powder is specified in Table 8.

The so-obtained magnetic paint was applied to and dried on a 15 μm thick polyethylene terephthalate film so that the dry thickness of the magnetic layer formed was 4 μm.

Once a solvent was removed by heating, each film was subjected to a surface smoothing process under the conditions of a temperature of 60° to 80° C., and pressure of 100 to 300 kg/cm, by using a supercalender, and then, each film was slit into strips of a specified width. Thus video tape samples were prepared Each video tape sample was evaluated for characteristics and physical properties.

The results are listed in Table 8.

Each characteristic was measured as follows.

Surface Coarseness of Magnetic Layer

The surface coarseness of a magnetic tape was measured using a coarseness analyzer, Model SE-3FK manufactured by Kosaka Kenkyusho (cutoff level, 0.25 mm).

Friction Coefficients Before and After Curing Process

This item was measured, under conditions of tape speed of 3.3 cm/sec. and tape tension of 20 g, by using a MSC tape travel tester manufactured by Yokohama System, both before and after a curing process (temperature, 70° C.; 12 hours).

Squareness Ratio

Using a VSM (with measured magnetic field, 10 KOe), a ratio (Bm/Rb) between the residual magnetic flux density (Br) and saturated magnetic flux density (Bm) was determined.

RF Output

This item was evaluated using, as a reference output, the output of the video tape of Example 2, obtainable when reproducing 100% white signal.

Lumi S/N

This item was measured using a video noise meter, manufactured by Shibasoku, where the S/N, based on 100% white signal, of each video tape sample was compared with that of a reference tape manufactured by Konica

Chroma S/N

This item was measured using a video noise meter, manufactured by Shibasoku, where the S/N, based on chroma signal, of each video tape sample was compared with that of a reference tape manufactured by Konica.

COMPARATIVE EXAMPLES 9 through 13

Video tape samples were prepared in a manner identical with that of the previously described Example 15 except that for preparing a magnetic paint, the ferromagnetic iron oxide powder in Example 15 was replaced with each of the ferromagnetic iron oxide powders listed in Table 8, and then, the characteristics of the so-obtained video tape samples were examined. The results obtained are listed in Table 8.

TABLE 8

|  | Amount in ferromagnetic iron oxide powder | | Surface coarseness of magnetic layer (μm) | Friction coefficients, before and after curing process (before/after) | Magnetic characteristics Squareness ratio (Br/Bm) | Traveling characteristics test (temperature, 40° C.; humidity, 80%) | Electromagnetic conversion characteristics | | |
|---|---|---|---|---|---|---|---|---|---|
|  | Si (wt %) | Zn (wt %) |  |  |  |  | RF output (db) | Lumi S/N (db) | Chroma S/N (db) |
| Example 15 | 0.13 | 0.01 | 0.011 | 0.18/0.18 | 0.83 | Completed 100 hour | +0.2 | +0.1 | +0.2 |

TABLE 8-continued

| | Amount in ferromagnetic iron oxide powder | | Surface coarseness of magnetic layer (μm) | Friction coefficients, before and after curing process (before/after) | Magnetic characteristics Squareness ratio (Br/Bm) | Traveling characteristics test (temperature, 40° C.; humidity, 80%) | Electromagnetic conversion characteristics | | |
|---|---|---|---|---|---|---|---|---|---|
| | Si (wt %) | Zn (wt %) | | | | | RF output (db) | Lumi S/N (db) | Chroma S/N (db) |
| Comparative Example 9 | 0.02 | 0.01 | 0.018 | 0.19/0.31 | 0.81 | operation Stopped, at 40 hours | −0.2 | −0.1 | −0.3 |
| Comparative Example 10 | 0.02 | 0.60 | 0.021 | 0.19/0.33 | 0.76 | Stopped, at 48 hours | −1.0 | −1.2 | −1.1 |
| Comparative Example 11 | 0.35 | 0.01 | 0.018 | 0.20/0.21 | 0.71 | Stopped, at 80 hours | −1.5 | −1.3 | −1.2 |
| Comparative Example 12 | 0.35 | 0.06 | 0.020 | 0.21/0.23 | 0.74 | Stopped, at 70 hours | −1.8 | −1.2 | −1.2 |
| Comparative Example 13 | 0.45 | 0 | 0.022 | 0.23/0.24 | 0.74 | Stopped, at 70 hours | −1.9 | −1.3 | −1.5 |

Evaluation

As can be understood from the data in Table 8, the magnetic layer of the magnetic medium according to the invention is free from deterioration in magnetic characteristics, and loss in friction coefficient even after a curing process. The reason for such an advantage is that according to the invention, ferromagnetic iron oxide powder incorporates a specific amount of silicon and/or zinc to cover individual particles, thereby activity on the surface of individual ferromagnetic iron oxide particles can be controlled as intended, and thereby appropriate amounts of dispersing agent, function group-containing binder, and lubricant are adsorbed on the individual particles, thus the dispersion status of ferromagnetic iron oxide powder in the magnetic layer is positively improves, and, at the same time, the elution of lubricant during a curing process is prevented. It is also apparent that the surface smoothness of the magnetic layer on the magnetic recording medium of the invention is small, and that there are positive improvements in traveling characteristics, magnetic characteristics, and electromagnetic conversion characteristics of the medium Effects of the Invention According to the invention a high performance magnetic recording medium, whose advantages include the following:

(1) the ferromagnetic iron oxide powder contain, at a specific ratio, silicon and/or zinc, thereby otherwise more manifest activity of the surface of individual ferromagnetic iron oxide particles is reduced;

(2) as a result, a functional group-containing binder, as well as of a dispersing agent, are positively inhibited from being adsorbed onto ferromagnetic iron oxide particles in the magnetic layer until a lubricant is similarly adsorbed, thereby there is not much non-adsorbed adsorber present at the surface area of the magnetic layer, and such a disadvantqage is commonly seen with a magnetic recording medium containing ferromagnetic iron oxide particles that lack the treatment according to the invention;

(3) accordingly, non-adsorbed adsorbent and the like are not transferred to a support in the course of a curing process in magnetic recording medium manufacturing, thereby the recording medium is free from increase in friction coefficient even after the curing process;

(4) at the same time, ratios of silicon and/or zinc contanined in the ferromagnetic iron oxide particles are within specific ranges, thereby surface coarseness of the magnetic layer is reduced and the magnetic layer is free from deterioration in magnetic characteristics; and (5) the magnetic recording medium of the invention excels in electromagnetic conversion characteristics and operation durability.

EXAMPLES 16 and 17 AND COMPARATIVE EXAMPLE 14

Figure 3:
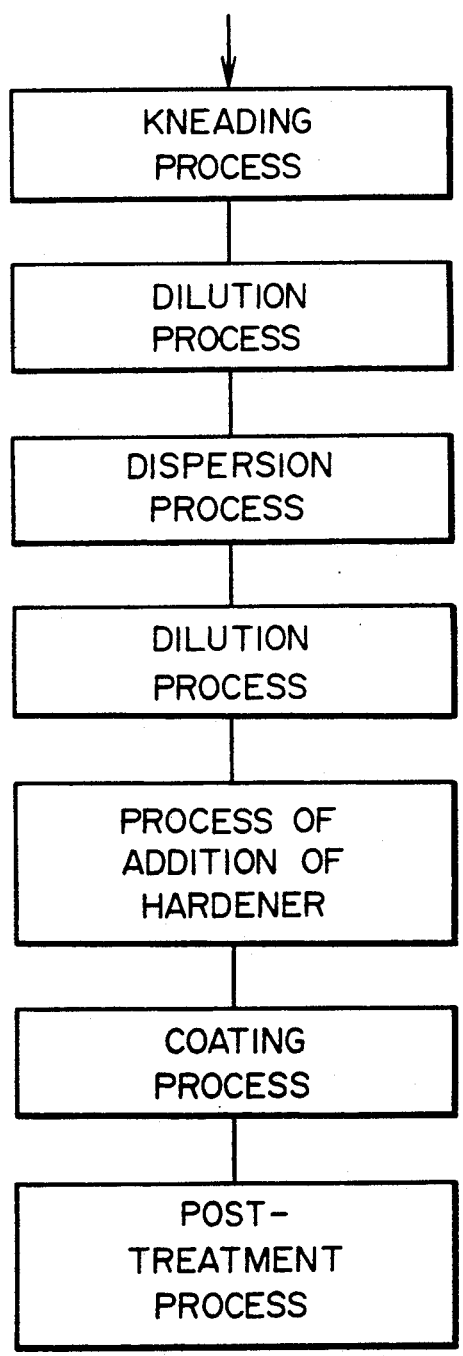
FIG. 3 is a flow chart illustrating a manufacturing process according to the invention.

Video tape samples were prepared based on the processes in FIG. 3.

Kneading Process

The following components were blended for 1 hour with an open kneader to prepare a kneaded product.

| | |
|---|---|
| Co-coated iron oxide (containing Si and Al in amounts equivalent to those of Example 1) (BET value in Example 16, 40 m²/g; in Example 17, 45 m²/g; in Comparative Example 14, 25 m²/g) | 100 parts |
| Vinyl chloride copolymer resin containing sulfo group | 10 parts |
| Carbon Black | 3 parts |
| RP-710 (phosphoric acid ester) | 3 parts |
| Al₂O₃ | 4 parts |
| Methyl ethyl ketone | 50 parts |

Diluting Process

To 170 parts kneaded product were added the following components to dilute the product.

| | |
|---|---|
| Urethane resin | 6 parts |
| Methyl ethyl ketone | 30 parts |
| Toluene | 40 parts |

Dispersing Process

After the diluting process, the kneaded product was subjected to dispersing for 2 hours using a sand grinder. (Diluting process)

246 parts liquid dispersion was diluted with the following components.

| | |
|---|---|
| MA (myristic acid) | 1 part |
| SA (stearic acid) | 1 part |
| Bust (butyl stearate) | 2 parts |
| Methyl ethyl ketone | 40 parts |
| Toluene | 40 parts |

Curing Agent Adding Process 10 parts polyisocyanate (Coronate L, Nippon Polyurethane) was added to the product, and thus, a magnetic coating solution was obtained.

(Coating Process and After-treatment Process)

Each magnetic coating solution was applied to and dried on a 14 μm thick polyester base film using a reverse roller coater so that the dry thickness of the magnetic layer formed was 5 0 μm. Each film was subjected to a surface smoothing process, and then, to a curing process, and was slit into ½ strips.

COMPARATIVE EXAMPLES 15 and 16

Figure 4:
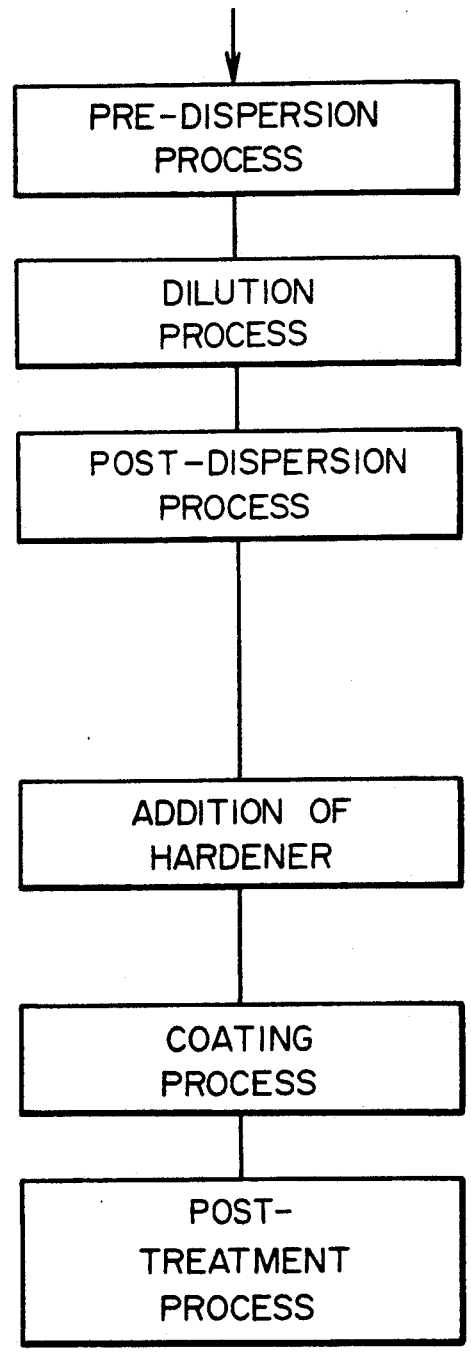
FIG. 4 is a flow chart illustrating a manufacturing process of a comparative embodiment.

Video tapes were prepared based on the processes in FIG. 4.

Pre-dispersing Process

The following components were subjected to dispersing for 4 hours using a sand grinder.

| | |
|---|---|
| Co-coated iron oxide | 100 parts |
| (BET value in Comparative Example 15, 25 m²/g; in Comparative Example 16, 40 m²/g) | |
| Vinyl chloride copolymer resin containing sulfo group | 10 parts |
| Carbon Black | 3 parts |
| RP-710 (phosphoric acid ester) | 3 parts |
| Al₂O₃ | 4 parts |
| Methyl ethyl ketone | 80 parts |
| Toluene | 40 parts |

Diluting Process and After-dispersin Process

To 240 parts of the above liquid dispersion were added the following components to dilute the product, and then, the dispersion was further subjected to dispersing for 1 hour using a sand grinder.

| | |
|---|---|
| Urethane resin | 6 parts |
| MA (myristic acid) | 1 part |
| SA (stearic acid) | 1 part |
| Bust (butyl stearate) | 2 parts |
| Methyl ethyl ketone | 40 parts |
| Toluene | 40 parts |

Curing Agent Adding Process)

10 parts polyisocyanate (Coronate L, Nippon Polyurethane) was added to 330 parts magnetic coating solution undergone after-dispersing process, and, thus a magnetic coating solution was obtained. (Coating process and after-treatment process)

Each magnetic coating solution was applied to and dried on a 14 μm thick polyester base film using a reverse roller coater so that the dry thickness of the magnetic layer formed was 5.0 μm. Each film was subjected to a surface smoothing process, and then, to a curing process, and was slit into ½" strips.

Evaluation

The respective video tape samples in Examples 16 and 17, Comparative Examples 14 through 16, the squareness ratio, video S/N, traveling characteristics, and dynamic friction coefficient were measured. The measuring and evaluation methods used are as follows.

Squareness Ratio

Br/Bm was determined at Hm 5KOe, using a sample-vibrating type fluxmeter (manufactured by Toei Kogyo).

Video S/N

Using a noisemeter, Model 925C, manufactured by Shibasoku, this item was evaluated by determining difference in S/N ratios between that of a sample and that of the video tape of Comparative Example 15, i.e. a reference video tape. Noise levels were determined using a high pass filter whose threshold level being 10 KHz, and a low pass filter whose threshold level being 4 MHz. The video tape deck used was Model NV 8300 manufactured by Matsushita.

Traveling Characteristics

Each video tape sample was allowed to run for 200 hours at 40° C., and 80%RH, thereby RF output loss, skew, and powder departure were measured. A indicates good; B, ordinary; and C, unsatisfactory.

Dynamic Friction Coefficient

Each video tape sample was loaded into a tape travel tester, Model TBT-300D manufactured by Yokohama System Kenkyusho as wound 180° around a 4 mm dia. cromium-plated stainless pin, and at 25° C., the friction coefficitent was measured at a tape speed 1 cm/sec. and entrance tension of 20 g, and then, μk ws arithmetically determined with the expression below.

$$\mu k = \frac{1}{\pi} \ln \frac{x}{20} \quad (x; \text{ exit tension in grams}).$$

Measuring results of the respective video tape samples are listed in Table 9.

TABLE 9

| | Relative surface area of iron oxide (m²g, BET) | Layer forming process | Squareness ratio | Video S/N (dB) | Traveling characteristics | Dynamic friction coefficient (μk) |
|---|---|---|---|---|---|---|
| Example 16 | 40 | FIG. 3 | 0.86 | +3.0 | A | 0.18 |
| Example 17 | 45 | FIG. 3 | 0.86 | +3.5 | A | 0.18 |
| Comparative Example 14 | 25 | FIG. 3 | 0.82 | +0.0 | B | 0.25 |
| Comparative Example 15 | 25 | FIG. 4 | 0.82 | +0.0 | B | 0.24 |
| Comparative Example 16 | 40 | FIG. 4 | 0.77 | +0.0 | V | 0.40 |

As can be understood from the results in this table, manufacturing, according to the invention, magnetic recording media provides video tapes of good dispersibility, high squareness ratio and S/N ratio, good surface characteristics, and small friction coefficient, and of excellent traveling characteristics.

EXAMPLES 18 AND 19, AND COMPARATIVE EXAMPLES 17 AND 18

Video tape samples were prepared, based on the processes in FIG. 3.

Kneading Process

The following components were blended for 1 hour with an open kneader to prepare a kneaded product.

| | |
|---|---|
| Co-coated iron oxide (containing Si and Al in amounts equivalent to those of Exampel 1) (BET value in Example 18 and Comparative Example 18, 40 m$^2$/g; in Example 19, 25 m$^2$/g) | 100 parts |
| Vinyl chloride copolymer resin containing sulfo group | 10 parts |
| Urethane resin (average molecular weight, 60000 in Examples 18 and 19, and in Comparative Example 17; 100000 in Comparative Example 18) | 6 parts |
| Carbon Black | 3 parts |
| RP-710 (phosphoric acid ester) | 3 parts |
| Al$_2$O$_3$ | 4 parts |
| Methyl ethyl ketone | 40 parts |

Diluting Process

To 166 parts kneaded product were added the following components to dilute the product.

| | |
|---|---|
| Methyl ethyl ketone | 40 parts |
| Toluene | 40 parts |

Dispersing Process

After the diluting process, the kneaded product was subjected to dispersing for 2 hours using a sand grinder.

Diluting Process 246 parts liquid dispersion was diluted with the following components.

| | |
|---|---|
| MA (myristic acid) | 1 part |
| SA (stearic acid) | 1 part |
| Bust (butyl stearate) | 2 parts |
| Methyl ethyl ketone | 40 parts |
| Toluene | 40 parts |

Curing Agent Adding Process 10 parts polyisocyanate (Coronate L, Nippon Polyurethane) was added to the product, and thus, a magnetic coating solution was obtained.

Coating Process and After-treatment Process

Each magnetic coating solution was applied to and dried on a 14 μm thick polyester base film using a reverse roller coater so that the dry thickness of the magnetic layer formed was 5.0 μm. Each film was subjected to a surface smoothing process, and then, to a curing process, and was slit into ½" strips.

COMPARATIVE EXAMPLES 19 and 20

Video tapes were prepared based on the processes in FIG. 4.

Pre-dispersing Process

The following components were subjected to dispersing for 4 hours using a sand grinder.

| | |
|---|---|
| Co-coated iron oxide (BET value in Comparative Example 19, 25 m$^2$/g; in Comparative Example 20, 40 m$^2$/g;) | 100 parts |
| Vinyl chloride copolymer resin containing sulfo group | 10 parts |
| Carbon Black | 3 parts |
| RP-710 (phosphoric acid ester) | 3 parts |
| Al$_2$O$_3$ | 4 parts |
| Methyl ethyl ketone | 80 parts |
| Toluene | 40 parts |

Diluting Process and After-dispersing Process

To 240 parts of the above liquid dispersion were added the following components to dilute the product, and then, the dispersion was further subjected to dispersing for 1 hour using a sand grinder.

| | |
|---|---|
| Urethane resin | 6 parts |
| MA (myristic acid) | 1 part |
| SA (stearic acid) | 1 part |
| Bust (butyl stearate) | 2 parts |
| Methyl ethyl ketone | 40 parts |
| Toluene | 40 parts |

Curing Agent Adding Process 10 parts polyisocyanate (Coronate L, Nippon Polyurethane) was added to 330 parts magnetic coating solution undergone after-dispersing process, and, thus a magnetic coating solution was obtained.

Coating Process and After-treatment Process

Each magnetic coating solution was applied to and dried on a 14 μm thick polyester base film using a reverse roller coater so that the dry thickness of the magnetic layer formed was 5.0 μm. Each film was subjected to a surface smoothing process, and then, to a curing process, and was slit into ½" strips.

Evaluation

The respective video tape samples in Examples 18 and 19, Comparative Examples 17 through 20, the squareness ratio, video S/N, traveling characteristics, and dynamic friction coefficient were measured The measuring and evaluation methods used are as follows.

Squareness Ratio

Br/Bm was determined at Hm 5KOe, using a sample-vibrating type fluxmeter (manufactured by Toei Kogyo).

Video S/N

Using a noisemeter, Model 925C, manufactured by Shibasoku, this item was evaluated by determining difference in S/N ratios between that of a sample and that of the video tape of Comparative Example 19, i.e. a reference video tape.

Noise levels were determined using a high pass filter whose threshold level being 10 KHz, and a low pass filter whose threshold level being 4 Hz.

The video tape deck used was Model NV 8300 manufactured by Matsushita.

Traveling Characteristics

Each video tape sample was allowed to run for 200 hours at 40° C., and 80%RH, thereby RF output loss, skew, and powder departure were measured. A indicates good; B, ordinary; and C, unsatisfactory.

Dynamic Friction Coefficient

Each video tape sample was loaded into a tape travel tester, Model TBT-300D manufactured by Yokohama System Kenkyusho as wound 180° around a 4 mm dia. cromium-plated stainless pin, and at 25° C., the friction coefficitent was measured at a tape speed 1 cm/sec. and entrance tension of 20 g, and then, μk ws arithmetically determined with the expression below.

$$\mu k = \frac{1}{\pi} \ln \frac{x}{20} \quad (x; \text{ exit tension in grams}).$$

Measuring results of the respective video tape samples are listed in Table 10.

TABLE 10

| | Relative surface area of iron oxide (m²g, BET) | Layer forming process | Average molecular weight of urethane resin added in kneading process | Squareness ratio | Video S/N (dB) | Traveling characteristics | Dynamic friction coefficient (μk) |
|---|---|---|---|---|---|---|---|
| Example 18 | 40 | FIG. 3 | 60000 | 0.85 | +3.0 | A | 0.19 |
| Example 19 | 45 | FIG. 3 | 60000 | 0.86 | +3.4 | A | 0.19 |
| Comparative Example 17 | 25 | FIG. 3 | 60000 | 0.82 | +0.0 | B | 0.24 |
| Comparative Example 18 | 40 | FIG. 3 | 100000 | 0.78 | +1.0 | C | 0.36 |
| Comparative Example 19 | 25 | FIG. 4 | — | 0.82 | +0.0 | B | 0.23 |
| Comparative Example 20 | 40 | FIG. 4 | — | 0.76 | +0.1 | C | 0.38 |

As can be understood from the results in this table, manufacturing, according to the invention, magnetic recording media provides video tapes of good dispersibility, high squareness ratio and S/N ratio, good surface characteristics, and small friction coefficient, and of excellent traveling characteristics.

The components, proportions, order of processing steps, and the like, in the following examples can be variously modified as far as the modification does not violate the spirit of the present invention. The term "part" is always "part by weight".

Video Tape Preparation

First, each of videotapes of Examples 20 and 21, and Comparative Examples 21 through 23 was prepared as follows. Examples 20 and 21, and Comparative Example 21

Figure 5:
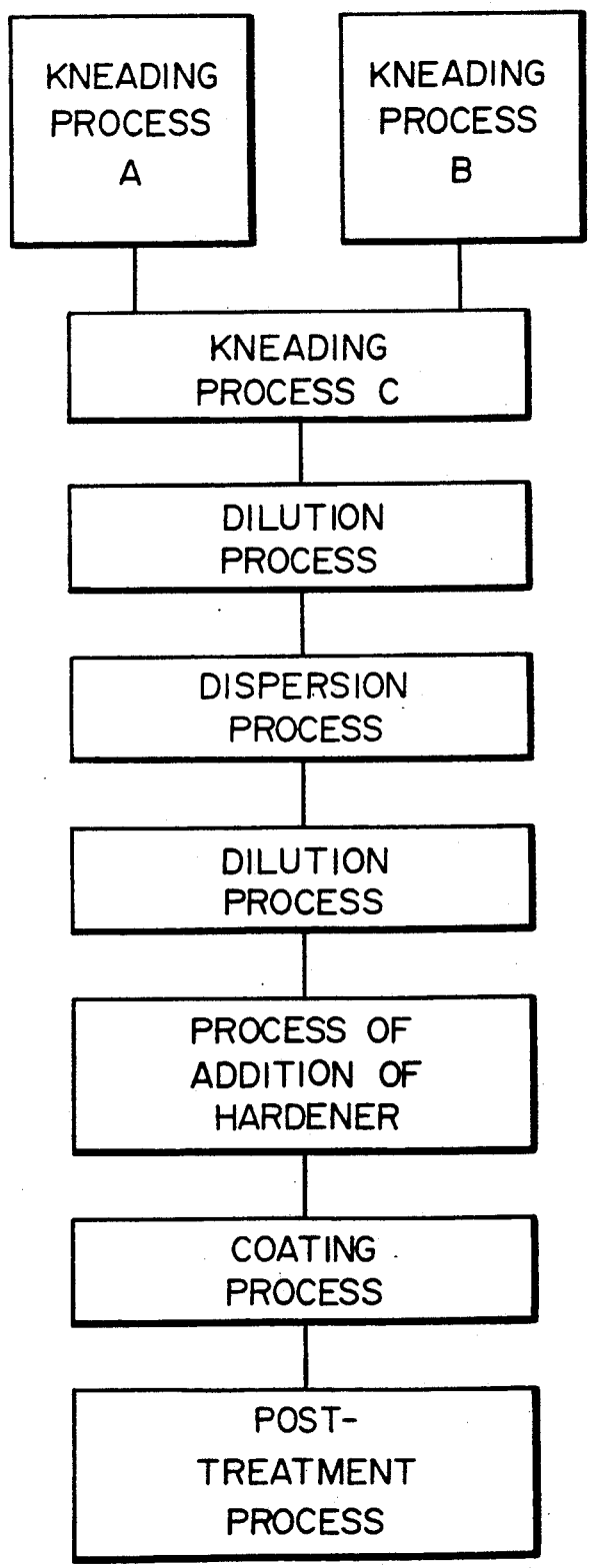
FIGS. 5 and 6 are flow charts independently illustrating a manufacturing process according to the invention.

Video tape samples were prepared ,based on the processes in FIG. 5.

Kneading Process A

The following components were blended for 1 hour with an open kneader to prepare a first kneaded product.

| | |
|---|---|
| Co-coated iron oxide (containing Si and Al in amounts equivalent to those of Example 1)(BET value in Example 20, 40 m²/g; in Example 21, 45 m²/g; in Comparative Example 21, 25 m²/g) | 100 parts |
| Vinyl chloride copolymer resin containing sulfo group | 10 parts |
| RP-710 (phosphoric acid ester) | 2.7 parts |
| Methyl ethyl ketone | 50 parts |

Kneading Process B

The following components were blended for 1 hour with an open kneader to prepare a second kneaded product.

| | |
|---|---|
| Carbon Black | 3 parts |
| RP-710 (phosphoric acid ester) | 0.3 part |
| Vinyl chloride copolymer resin containing sulfo group | 1 part |
| Methyl ethyl ketone | 5 parts |

Kneading Process C 156.7 parts first keaded product and 9.3 parts second kneaded product were blended together for 230 minutes in an open kneader to prepare a third kneaded product.

Diluting Process

To 166 parts third kneaded product were added the following components to dilute the product.

| | |
|---|---|
| Urethane resin | 6 parts |
| Al₂O₃ | 4 parts |
| Methyl ethyl ketone | 30 parts |
| Toluene | 40 parts |

Dispersing Process

After the diluting process, the kneaded product was subjected to dispersing for 2 hours using a sand grinder.

Diluting Process 246 parts liquid dispersion was diluted with the following components.

| | |
|---|---|
| MA (myristic acid) | 1 part |
| SA (stearic acid) | 1 part |
| Bust (butyl stearate) | 2 parts |
| Methyl ethyl ketone | 40 parts |
| Toluene | 40 parts |

Curing Agent Adding Process 10 parts polyisocyanate (Coronate L, Nippon Polyurethane) was added to the product, and thus, a magnetic coating solution was obtained.

Coating Process and After-treatment Process

Each magnetic coating solution was applied to and dried on a 14 μm thick polyester base film using a reverse roller coater so that the dry thickness of the magnetic layer formed was 5.0 μm. Each film was subjected to a surface smoothing process, and then, to a curing process, and was slit into ½" strips.

COMPARATIVE EXAMPLES 22 and 23

Video tapes were prepared based on the processes in FIG. 4.

Pre-dispersing Process

The following components were subjected to dispersing for 4 hours using a sand grinder.

| | |
|---|---|
| Co-coated iron oxide (BET value in Comparative Example 22, 25 m²/g; in Comparative Example 23, 40 m²/g) | 100 parts |
| Vinyl chloride copolymer resin containing sulfo group | 10 parts |
| Carbon Black | 3 parts |
| RP-710 (phosphoric acid ester) | 3 parts |
| Al₂O₃ | 4 parts |
| Methyl ethyl ketone | 80 parts |
| Toluene | 40 parts |

Diluting Process and Post-dispersing Process

To 240 parts of the above liquid dispersion were added the following components to dilute the product, and then, the dispersion was further subjected to dispersing for 1 hour using a sand grinder.

| | |
|---|---|
| Urethane resin | 6 parts |
| MA (myristic acid) | 1 part |
| SA (stearic acid) | 1 part |
| Bust (butyl stearate) | 2 parts |
| Methyl ethyl ketone | 40 parts |
| Toluene | 40 parts |

Curing Agent Adding Process 10 parts polyisocyanate (Coronate L, Nippon Polyurethane) was added to 330 parts magnetic coating solution undergone after-dispersing process, and, thus a magnetic coating solution was obtained.

Coating Process and After-treatment Process

Each magnetic coating solution was applied to and dried on a 14 μm thick polyester base film using a reverse roller coater so that the dry thickness of the magnetic layer formed was 5.0 μm. Each film was subjected to a surface smoothing process, and then, to a curing process, and was slit into ½" strips.

Evaluation

The respective video tape samples in Examples 20 and 21, Comparative Examples 21 through 23, the squareness ratio, video S/N, traveling characteristics, and dynamic friction coefficient were measured The measuring and evaluation methods used are as follows.

Squareness Ratio

Br/Bm was determined at Hm 5KOe, using a sample-vibrating type fluxmeter (manufactured by Toei Kogyo).

Video S/N

Using a noisemeter, Model 925C, manufactured by Shibasoku, this item was evaluated by determining difference in S/N ratios between that of a sample and that of the video tape of Comparative Example 22, i.e. a reference video tape.

Noise levels were determined using a high pass filter whose threshold level being 10 KHz, and a low pass filter whose threshold level being 4MHz. The video tape deck used was Model NV 8300 manufactured by Matsushita.

Traveling Characteristics

Each video tape sample was allowed to run for 200 hours at 40° C., and 80%RH, thereby RF output loss, skew, and powder departure were measured A indicates good; B, ordinary; and C, unsatisfactory.

Dynamic Friction Coefficient

Each video tape sample was loaded into a tape travel tester, Model TBT-300D manufactured by Yokohama System Kenkyusho as wound 180° around a 4 mm dia. cromium-plated stainless pin, and at 25° C., the friction coefficitent was measured at a tape speed 1 cm/sec. and entrance tension of 20 g, and then, μk ws arithmetically determined with the expression below.

$$\mu k = \frac{1}{\pi} \ln \frac{x}{20} \quad (x; \text{exit tension in grams}).$$

Measuring results of the respective video tape samples are listed in Table 11.

TABLE 11

| | Relative surface area of iron oxide (m²g, BET) | Layer forming process | Squareness ratio | Video S/N (dB) | Traveling characteristics | Dynamic friction coefficient (μk) |
|---|---|---|---|---|---|---|
| Example 20 | 40 | FIG. 5 | 0.86 | +3.2 | A | 0.17 |
| Example 21 | 45 | FIG. 5 | 0.87 | +3.6 | A | 0.17 |
| Comparative Example 21 | 25 | FIG. 5 | 0.82 | +0.0 | B | 0.24 |
| Comparative Example 22 | 25 | FIG. 4 | 0.82 | +0.0 | B | 0.25 |
| Comparative Example 23 | 40 | FIG. 4 | 0.78 | +0.1 | C | 0.37 |

As can be understood from the results in this table, manufacturing, according to the invention, magnetic recording media provides video tapes of good dispersibility, high squareness ratio and S/N ratio, good surface characteristics, and small friction coefficient, and of excellent traveling characteristics.

EXAMPLES 22 AND 23, AND COMPARATIVE EXAMPLE 24

Figure 6:
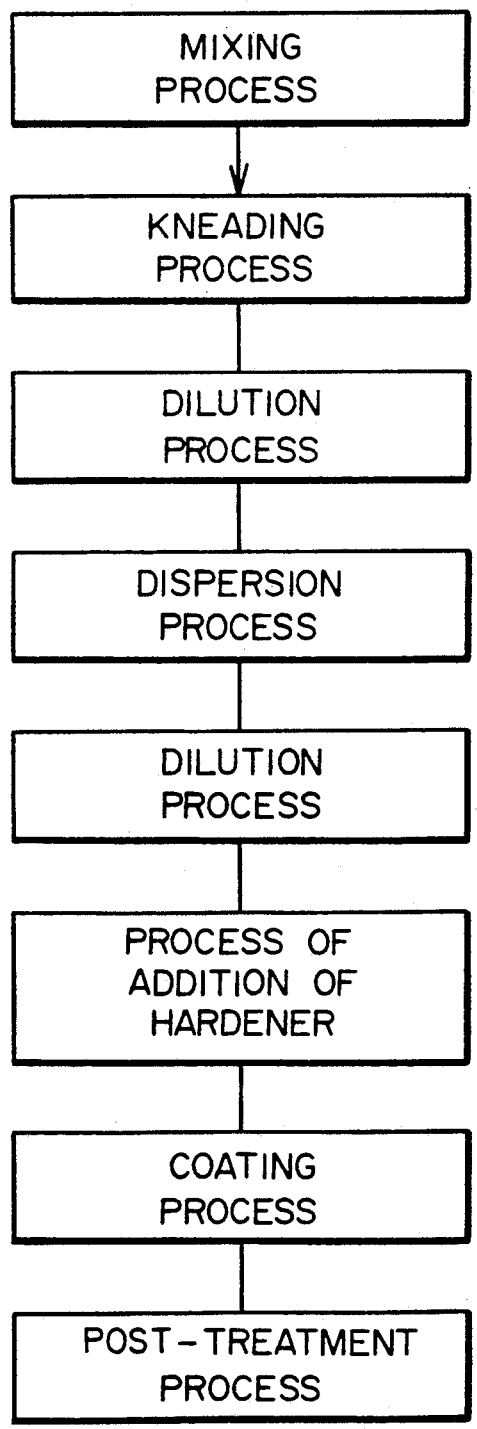

Based on the manufacturing processes in FIG. 6, video tape samples were prepared.

Blending Process

The following components were stirred and blended for 30 minutes using a twin screw mixer, thus a blended product was obtained.

| | |
|---|---|
| Co-coated iron oxide (containing Si and Al in amounts equivalent to those of Example 1) (BET value in Example 22, 40 m$^2$/g; in Example 23, 45 m$^2$/g; in Comparative Example 24, 25 m$^2$/g) | 100 parts |
| Phosphoric acid ester | 3 parts |

Kneading Process

The following components were kneaded for 1 hour using an open kneader, thus a kneaded product was obtained

| | |
|---|---|
| Kneaded product above | 103 parts |
| Vinyl chloride copolymer resin containing sulfo group | 10 parts |
| Carbon Black | 3 parts |
| Al$_2$O$_3$ | 4 parts |
| Methyl ethyl ketone | 50 parts |

Diluting Process

To 170 parts kneaded product were added the following components to dilute the product.

| | |
|---|---|
| Urethane resin | 6 parts |
| Methyl ethyl ketone | 30 parts |
| Toluene | 40 parts |

Dispersing Process

After the diluting process, the kneaded product was subjected to dispersing for 2 hours using a sand grinder.

Diluting Process 246 parts liquid dispersion was diluted with the following components.

| | |
|---|---|
| MA (myristic acid) | 1 part |
| SA (stearic acid) | 1 part |
| Bust (butyl stearate) | 2 parts |
| Methyl ethyl ketone | 40 parts |
| Toluene | 40 parts |

Curing Agent Adding Process 10 parts polyisocyanate (Coronate L, Nippon Polyurethane) was added to the product, and thus, a magnetic coating solution was obtained.

Coating Process and After-treatment Process

Each magnetic coating solution was applied to and dried on a 14 μm thick polyester base film using a reverse roller coater so that the dry thickness of the magnetic layer formed was 5.0 μm. Each film was subjected to a surface smoothing process, and then, to a curing process, and was slit into ½" strips.

COMPARATIVE EXAMPLES 25 and 26

Video tapes were prepared based on the processes in FIG. 4.

Pre-dispersing Process

The following components were subjected to dispersing for 4 hours using a sand grinder.

| | |
|---|---|
| Co-coated iron oxide (BET value in Comparative Example 25, 25 m$^2$/g; in Comparative Example 26, 40 m$^2$/g;) | 100 parts |
| Vinyl chloride copolymer resin containing sulfo group | 10 parts |
| Carbon Black | 3 parts |
| RP-710 (phosphoric acid ester) | 3 parts |
| Al$_2$O$_3$ | 4 parts |
| Methyl ethyl ketone | 80 parts |
| Toluene | 40 parts |

Diluting Process and After-dispersing Process

To 240 parts of the above liquid dispersion were added the following components to dilute the product, and then, the dispersion was further subjected to dispersing for 1 hour using a sand grinder.

| | |
|---|---|
| Urethane resin | 6 parts |
| MA (myristic acid) | 1 part |
| SA (stearic acid) | 1 part |
| Bust (butyl stearate) | 2 parts |
| Methyl ethyl ketone | 40 parts |
| Toluene | 40 parts |

Curing Agent Adding Process 10 parts polyisocyanate (Coronate L, Nippon Polyurethane) was added to 330 parts magnetic coating solution undergone after-dispersing process, and, thus a magnetic coating solution was obtained.

Coating Process and After-treatment Process

Each magnetic coating solution was applied to and dried on a 14 μm thick polyester base film using a reverse roller coater so that the dry thickness of the magnetic layer formed was 5.0 μm. Each film was subjected to a surface smoothing process, and then, to a curing process, and was slit into ½" strips.

Evaluation

The respective video tape samples in Examples 22 and 23, Comparative Examples 24 through 26, the squareness ratio, video S/N, traveling characteristics, and dynamic friction coefficient were measured. The measuring and evaluation methods used are as follows.

Squareness Ratio

Br/Bm was determined at Hm 5KOe, using a sample-vibrating type fluxmeter (manufactured by Toei Kogyo).

Video S/N

Using a noisemeter, Model 925C, manufactured by Shibasoku, this item was evaluated by determining difference in S/N ratios between that of a sample and that of the video tape of Comparative Example 25, i.e. a reference video tape.

Noise levels were determined using a high pass filter whose threshold level being 10 KHz, and a low pass filter whose threshold level being 4MHz. The video tape deck used was Model NV 8300 manufactured by Matsushita.

Traveling Characteristics

Each video tape sample was allowed to run for 200 hours at 40° C., and 80%RH, thereby RF output loss, skew, and powder departure were measured A indicates good; B, ordinary; and C, unsatisfactory.

Dynamic Friction Coefficient

Each video tape sample was loaded into a tape travel tester, Model TBT-300D manufactured by Yokohama System Kenkyusho as wound 180° around a 4 mm dia. cromium-plated stainless pin, and at 25° C., the friction coefficitent was measured at a tape speed 1 cm/sec. and entrance tension of 20 g, and then, μk ws arithmetically determined with the expression below.

$$\mu k = \frac{1}{\pi} \ln \frac{x}{20} \quad (x; \text{exit tension in grams}).$$

Measuring results of the respective video tape samples are listed in Table 12.

TABLE 12

Figure 2:
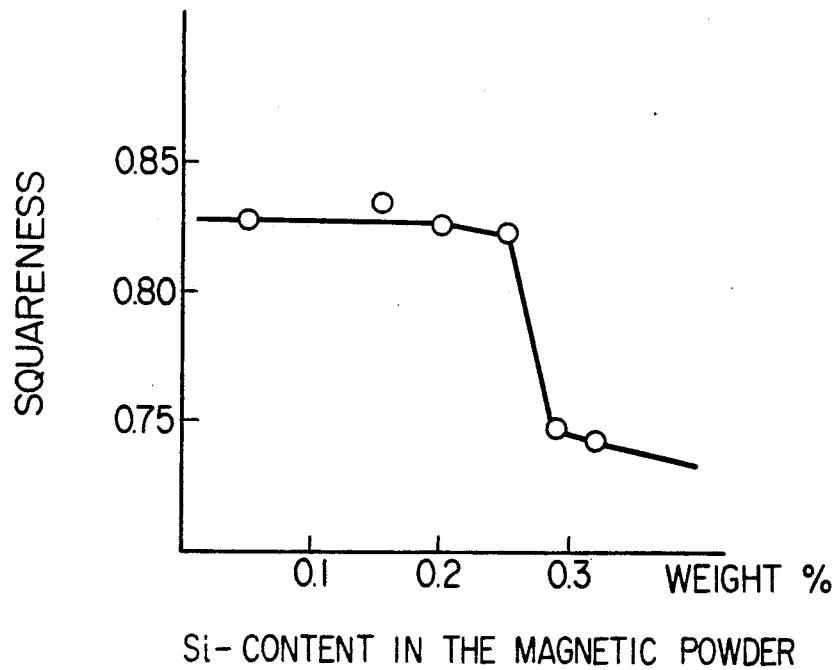
FIG. 2 is a graph illustrating the interrelation of amounts of silicon added to ferromagnetic iron oxide powder of a conventional magnetic recording medium versus squareness ratios.

|  | Relative surface area of iron oxide (m²g, BET) | Layer forming process | Squareness ratio | Video S/N (dB) | Traveling characteristics | Dynamic friction coefficient (μk) |
|---|---|---|---|---|---|---|
| Example 22 | 40 | FIG. 1 | 0.86 | +3.2 | A | 0.18 |
| Example 23 | 45 | FIG. 1 | 0.87 | +3.8 | A | 0.17 |
| Comparative Example 24 | 25 | FIG. 1 | 0.82 | +0.0 | B | 0.24 |
| Comparative Example 25 | 25 | FIG. 2 | 0.82 | +0.0 | B | 0.24 |
| Comparative Example 26 | 40 | FIG. 2 | 0.78 | +0.0 | C | 0.38 |

As can be understood from the results in this table, manufacturing, according to the invention, magnetic recording media provides video tapes of good dispersibility, high squareness ratio and S/N ratio, good surface characteristics, and small friction coefficient, and of excellent traveling characteristics.

EXAMPLES 24 AND 25, AND COMPARATIVE EXAMPLES 27

Video tape samples were prepared, based on the processes in FIG. 3.

Kneading Process

The following components were blended for 1 hour with an open kneader to prepare a kneaded product.

| Co-coated iron oxide (containing Si and Al in amounts equivalent to those of Example 1) (BET value in Example 24, 40 m²/g; in Example 25, 45 m²/g; in Comparative Example 27, 25 m²/g) | 100 parts |
|---|---|
| Vinyl chloride copolymer resin containing sulfo group | 10 parts |
| Urethane resin containing carboxyl group | 6 parts |
| Carbon Black | 3 parts |
| RP-710 (phosphoric acid ester) | 3 parts |
| Al₂O₃ | 4 parts |
| Methyl ethyl ketone | 40 parts |

Diluting Process

To 166 parts kneaded product were added the following components to dilute the product.

| Methyl ethyl ketone | 40 parts |
|---|---|
| Toluene | 40 parts |

Dispersing Process

After the diluting process, the kneaded product was subjected to dispersing for 2 hours using a sand grinder.

Diluting Process 246 parts liquid dispersion was diluted with the following components.

| MA (myristic acid) | 1 part |
|---|---|
| SA (stearic acid) | 1 part |
| Bust (butyl stearate) | 2 parts |
| Methyl ethyl ketone | 40 parts |
| Toluene | 40 parts |

Curing Agent Adding Process 10 parts polyisocyanate (Coronate L, Nippon Polyurethane) was added to the product, and thus, a magnetic coating solution was obtained.

(Coating Process and After-treatment Process

Each magnetic coating solution was applied to and dried on a 14 μm thick polyester base film using a reverse roller coater so that the dry thickness of the magnetic layer formed was 5.0 μm. Each film was subjected to a surface smoothing process, and then, to a curing process, and was slit into ½" strips.

COMPARATIVE EXAMPLES 28 AND 29

Video tapes were prepared based on the processes in FIG. 4.

Pre-dispersing process

The following components were subjected to dispersing for 4 hours using a sand grinder.

| Co-coated iron oxide (BET value in Comparative Example 28, 25 m²/g; in Comparative Example 29, 40 m²/g) | 100 parts |
|---|---|
| Vinyl chloride copolymer resin containing | 10 parts |

-continued

| | |
|---|---|
| sulfo group | |
| Carbon Black | 3 parts |
| RP-710 (phosphoric acid ester) | 3 parts |
| Al$_2$O$_3$ | 4 parts |
| Methyl ethyl ketone | 80 parts |
| Toluene | 40 parts |

Diluting Process and After-dispersing Process

To 240 parts of the above liquid dispersion were added the following components to dilute the product, and then, the dispersion was further subjected to dispersing for 1 hour using a sand grinder.

| | |
|---|---|
| Urethane resin | 6 parts |
| MA (myristic acid) | 1 part |
| SA (stearic acid) | 1 part |
| Bust (butyl stearate) | 2 parts |
| Methyl ethyl ketone | 40 parts |
| Toluene | 40 parts |

Curing Agent Adding Process 10 parts polyisocyanate (Coronate L, Nippon Polyurethane) was added to 330 parts magnetic coating solution undergone after-dispersing process, and, thus a magnetic coating solution was obtained.

Coating Process and After-treatment Process

Each magnetic coating solution was applied to and dried on a 14 μm thick polyester base film using a reverse roller coater so that the dry thickness of the magnetic layer formed was 5.0 μm. Each film was subjected to a surface smoothing process, and then, to a curing process, and was slit into ½" strips.

Evaluation

The respective video tape samples in Examples 24 and 25, Comparative Examples 27 through 29, the squareness ratio, video S/N, traveling characteristics, and dynamic friction coefficient were measured. The measuring and evaluation methods used are as follows.

Squareness Ratio

Br/Bm was determined at Hm 5KOe, using a sample-vibrating type fluxmeter (manufactured by Toei Kogyo).

Video S/N

Using a noisemeter, Model 925C, manufactured by Shibasoku, this item was evaluated by determining difference in S/N ratios between that of a sample and that of the video tape of Comparative Example 28, i.e. a reference video tape.

Noise levels were determined using a high pass filter whose threshold level being 10 KHz, and a low pass filter whose threshold level being 4MHz. The video tape deck used was Model NV 8300 manufactured by Matsushita.

Traveling Characteristics

Each video tape sample was allowed to run for 200 hours at 40° C., and 80%RH, thereby RF output loss, skew, and powder departure were measured A indicates good; B, ordinary; and C, unsatisfactory.

Dynamic Friction Coefficient

Each video tape sample was loaded into a tape travel tester, Model TBT-300D manufactured by Yokohama System Kenkyusho as wound 180° around a 4 mm dia. cromium-plated stainless pin, and at 25° C., the friction coefficitent was measured at a tape speed 1 cm/sec. and entrance tension of 20 g, and then, μk ws arithmetically determined with the expression below.

$$\mu k = \frac{1}{\pi} \ln \frac{x}{20} \text{ (}x\text{: exit tension in grams).}$$

Measuring results of the respective video tape samples are listed in Table 13.

TABLE 13

| | Relative surface area of Co-containing iron oxide (m$^2$g, BET) | Layer forming process | Squareness ratio | Video S/N (dB) | Traveling characteristics | Dynamic friction coefficient (μk) |
|---|---|---|---|---|---|---|
| Example 24 | 40 | FIG. 3 | 0.86 | +3.1 | A | 0.17 |
| Example 25 | 45 | FIG. 3 | 0.87 | +3.7 | A | 0.18 |
| Comparative Example 27 | 25 | FIG. 3 | 0.82 | +0.0 | B | 0.23 |
| Comparative Example 28 | 25 | FIG. 4 | 0.82 | +0.0 | B | 0.25 |
| Comparative Example 29 | 40 | FIG. 4 | 0.77 | +0.3 | C | 0.38 |

As can be understood from the results in this table, manufacturing, according to the invention, magnetic recording media provides video tapes of good dispersibility, high squareness ratio and S/N ratio, good surface characteristics, and small friction coefficient, and of excellent traveling characteristics.

What is claimed is:

1. A magnetic recording medium comprising a non-magnetic support and provided thereon a magnetic layer containing a ferromagnetic iron oxide and a binder, said ferromagnetic iron oxide containing Si at a proportion of 0.10 to 0.25 % by weight based on the total weight of the iron oxide powder.

2. The magnetic recording medium of claim 1, wherein said binder is a vinyl chloride resin containing at least one substituent selected from the group consisting of a sulfo group, a phospho group, a carboxyl group, an alkali metal salt of sulfo group and an alkali metal salt of phospho group.

3. The magnetic recording medium of claim 1, wherein said ferromagnetic iron oxide has a BET value of not less than 35 m$^2$/g.

4. The magnetic recording medium of claim 1, wherein said ferromagnetic iron oxide contains Si at a proportion of 0.11 to 0.19 % by weight, and Ca at a proportion of 0.06 to 0.14 by weight, the ratio by weight of Si/ Ca being not less than 1.10.

5. The magnetic recording medium of claim 1, wherein said ferromagnetic iron oxide contains Si at a proportion of 0.10 to 0.25 % by weight, and Zn at a proportion of 0.001 to 0.50 by weight.

6. The magnetic recording medium of claim 2, wherein said magnetic recording medium further contains as a binder a polyurthane resin having a glass transition point of $-30°$ C. to $10°$ C. and a weight average molecular weight of 10000 to 100000.

7. The magnetic recording medium of claim 1, wherein said magnetic layer has a surface roughness in terms of Ra of not more than $0.015\mu$.

8. The magnetic recording medium of claim 7, wherein said surface roughness in terms of Ra is $0.008\mu$ to $0.015\mu$.

9. The magnetic recording medium of claim 2, wherein said magnetic recording medium comprises a carbon black which has a Moh's scale of hardness of 5 or more, and a primary average grain size of $10m\mu$ to $70 m\mu$.

* * * * *